US010225091B2

(12) United States Patent
Teng

(10) Patent No.: US 10,225,091 B2
(45) Date of Patent: Mar. 5, 2019

(54) METHOD FOR IMPLEMENTING POINT-TO-MULTIPOINT MULTICAST, NETWORK NODE, AND SYSTEM

(71) Applicant: Huawei Technologies Co., Ltd., Shenzhen (CN)

(72) Inventor: Xindong Teng, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 220 days.

(21) Appl. No.: 14/668,744

(22) Filed: Mar. 25, 2015

(65) Prior Publication Data

US 2015/0207640 A1    Jul. 23, 2015

Related U.S. Application Data

(63) Continuation of application No. PCT/CN2013/075598, filed on May 14, 2013.

(30) Foreign Application Priority Data

Sep. 29, 2012 (CN) .......................... 2012 1 0375288

(51) Int. Cl.
*H04L 12/723* (2013.01)
*H04L 12/913* (2013.01)
(Continued)

(52) U.S. Cl.
CPC ............ *H04L 12/18* (2013.01); *H04L 12/185* (2013.01); *H04L 45/507* (2013.01); *H04L 47/724* (2013.01); *H04L 61/2069* (2013.01)

(58) Field of Classification Search
CPC ................... H04L 45/50; H04L 45/507; H04L 2012/5624; H04L 1/0045
(Continued)

(56) References Cited

U.S. PATENT DOCUMENTS

2004/0125805 A1* 7/2004 De Clercq ............ H04L 45/507
370/395.5
2007/0217420 A1* 9/2007 Raj ........................ H04L 45/00
370/392
(Continued)

FOREIGN PATENT DOCUMENTS

CN    101197759 A    6/2008
CN    101286863 A    10/2008
(Continued)

OTHER PUBLICATIONS

Wijnands, I.J. et al., "Label Distribution Protocol Extensions for Point-to-Multipoint and Multipoint-to-Multipoint Label Switched Paths," Internet Standards Track Document, Internet Engineering Task Force (IETF), Request for Comments: 6388, Nov. 2011, 40 pages.

(Continued)

*Primary Examiner* — Asad M Nawaz
*Assistant Examiner* — Jason A Harley
(74) *Attorney, Agent, or Firm* — Slater Matsil, LLP

(57) ABSTRACT

Embodiments of the present invention provide a method for implementing P2MP multicast, a network node, and a system. The method includes: acquiring, by a network-side leaf node, an mLDP label of a downstream user-side leaf node and FEC information from an mLDP mapping message of the downstream user-side leaf node, then sending an mLDP mapping message that includes an mLDP label and the FEC information, to an upstream network-side root node, and generating a forwarding entry; searching for or establishing an RSVP P2MP LSP, allocating a label to the FEC information, and associating a forwarding entry of each network-side leaf node with the label of the FEC information; and sending an mLDP label of the network-side root node and the FEC information to an upstream user-side leaf node, and (Continued)

associating the mLDP label with the RSVP P2MP LSP and the label of the FEC information.

5 Claims, 16 Drawing Sheets

(51) Int. Cl.
    *H04L 12/26* (2006.01)
    *H04L 12/18* (2006.01)
    *H04L 29/12* (2006.01)

(58) Field of Classification Search
    USPC .................................................. 370/466, 390
    See application file for complete search history.

(56) References Cited

U.S. PATENT DOCUMENTS

| | | | | |
|---|---|---|---|---|
| 2011/0280123 | A1* | 11/2011 | Wijnands | H04L 45/507 370/228 |
| 2012/0027013 | A1* | 2/2012 | Napierala | H04L 45/04 370/390 |
| 2013/0010790 | A1* | 1/2013 | Shao | H04L 45/16 370/390 |
| 2013/0107090 | A1* | 5/2013 | Sato | H01L 27/14603 348/294 |
| 2013/0208582 | A1* | 8/2013 | Wijnands | H04L 49/552 370/218 |
| 2013/0336315 | A1* | 12/2013 | Guichard | H04L 12/4645 370/389 |
| 2014/0003425 | A1* | 1/2014 | Zhao | H04L 12/1836 370/390 |

FOREIGN PATENT DOCUMENTS

| | | |
|---|---|---|
| CN | 102263695 A | 11/2011 |
| CN | 102447611 A | 5/2012 |

OTHER PUBLICATIONS

Aggarwal, R. et al., "BGP Encodings and Procedures for Multicast in MPLS/BGP IP VPNs," Network Working Group, Internet Draft, Proposed Standard, Oct. 1, 2009, 61 pages.

Eckert, T. et al., "MPLS Multicast Encapsulations," Network Working Group, Standards Track, Updates 3032 and 4023, Aug. 2008, 11 pages.

Konstantynowicz, M. et al., "Signaling Root-Initiated Point-to-Multipoint Pseudowires using LDP," Internet Engineering Task Force, Internet Draft, Standards Track, Mar. 2, 2011, 16 pages.

Aggarwal, R. et al., "MPLS Upstream Label Assignment and Context-Specific Label Space," Network Working Group, Standards Track, Aug. 2008, 13 pages.

Rosen, E. et al., "Multicast in MPLS/BGP IP VPNs," Internet Engineering Task Force (IETF), Standards Track, ISSN: 2070-1721, Feb. 2012, 88 pages.

* cited by examiner

METHOD FOR IMPLEMENTING POINT-TO-MULTIPOINT MULTICAST, NETWORK NODE, AND SYSTEM

This application is a continuation of International Application No. PCT/CN2013/075598, filed on May 14, 2013, which claims priority to Chinese Patent Application No. 201210375288.1, filed on Sep. 29, 2012, both of which are hereby incorporated by reference in their entireties.

TECHNICAL FIELD

The present invention relates to the communications field, and in particular, to a method for implementing point-to-multipoint multicast, a network node, and a system.

BACKGROUND

With development of an Internet Protocol, Internet Protocol (IP) network, more and more applications use the IP network to perform data transmission. Data transmission of applications such as multimedia conferencing, real-time online gaming, and IP Television (IPTV) has a point-to-multipoint (or multipoint-to-multipoint) feature.

Compared with a unicast data transmission mode of the IP network, an IP multicast technology implements point-to-multipoint data transmission in the IP network. For multiple data receiving nodes, it is unnecessary to replicate all traffic of data at a sending end; instead, traffic is replicated at a corresponding node as required according to an IP forwarding path in the network. On the whole, only one piece of data is transmitted on any link in the network, until the data arrives at the receiving nodes. Therefore, compared with IP unicast transmission, IP multicast transmission has a remarkably lower requirement for network bandwidth, so that highest data transmission efficiency is achieved in the network. IP multicast transmission requires cooperation of a control plane in the network, which is completed by a corresponding multicast protocol, for example, Protocol Independent Multicast-Sparse Mode (PIM-SM) or Protocol Independent Multicast Source Specific Multicast (PIM-SSM). After protocol interaction, the IP network establishes a transmission path for multicast data, thereby achieving objectives of an optimal path and least bandwidth usage.

However, in terms of supporting real-time applications such as IPTV and streaming media, there are still restrictions for IP multicast, such as a bandwidth guarantee and failover, which restrict large-scale deployment of the applications. As the Multi Protocol Label Switching (MPLS) technology is deployed on a large scale, failover can be implemented and bandwidth requirements can be met. Therefore, the Point-to-MultiPoint (P2MP) multicast technology base on MPLS has become a hot topic currently.

Currently, the MPLS P2MP technology mainly includes two types: Resource Reservation Protocol (RSVP) P2MP and multicast Label Distribution Protocol (mLDP) P2MP. The former is an extension based on a point-to-point RSVP protocol, and the latter is an extension based on a point-to-point LDP protocol. A purpose of the MPLS P2MP technology is to establish a point-to-multipoint (or multipoint-to-multipoint) forwarding path for data forwarding.

According to an existing solution, in a P2MP-based multicast Virtual Private Network (VPN) application proposed by an Internet Engineering Task Force (IETF) draft, a core network establishes RSVP P2MP Path, while mLDP is used for access between each Provider Edge (PE) node and each Customer Edge (CE), and multicast traffic of a private network is transmitted through mLDP P2MP forwarding paths at two ends and a core RSVP P2MP forwarding path. In this way, mLDP may access P2MP. However, this application is an application that accesses the VPN. VPN negotiation needs to be performed at the control plane based on a complicated protocol, and a forwarding entry of a PE node must be established based on VPN information. Therefore, this solution is not applicable to a P2MP multicast scenario of a non-VPN application. Furthermore, in an existing multicast scenario, a PE node must perform mLDP protocol processing, and implementation thereof is complicated, and when a PE device does not support mLDP, deployment cannot be implemented.

SUMMARY

Embodiments of the present invention provide a method for implementing point-to-multipoint multicast, a network node, and a system, which can be applied to P2MP multicast in a non-VPN scenario and can also implement deployment when a PE device does not support mLDP.

To achieve the foregoing objective, the embodiments of the present invention use the following technical solutions:

According to a first aspect, a method for implementing point-to-multipoint multicast is provided, where the method includes:

receiving an mLDP mapping message from at least one downstream node, where each mLDP mapping message includes forwarding equivalence class FEC information and an mLDP label of a node to which the mLDP mapping message belongs;

acquiring a Resource Reservation Protocol point-to-multipoint path RSVP P2MP LSP according to the downstream nodes that send the mLDP mapping messages;

allocating a label to the FEC information, and sending the label of the FEC information to all the nodes that are on the RSVP P2MP LSP and send the mLDP mapping messages;

generating a packet forwarding entry of a local node according to an mLDP label of the local node, the RSVP P2MP LSP, and the label of the FEC information; and sending a new mLDP mapping message to an upstream node, where the new mLDP mapping message includes the FEC information and the mLDP label of the local node, and the FEC information includes an address of a user-side root node.

With reference to the first aspect, in a first possible implementation manner, the acquiring an RSVP P2MP LSP according to the downstream nodes that send the mLDP mapping messages includes:

searching for an existing RSVP P2MP LSP according to the downstream nodes that send the mLDP mapping messages; or establishing the RSVP P2MP LSP according to the downstream nodes that send the mLDP mapping messages, where the RSVP P2MP LSP includes all the downstream nodes that send the mLDP mapping messages.

With reference to the first aspect or the first possible implementation manner of the first aspect, in a second possible implementation manner, the allocating a label to the FEC information, and sending the label of the FEC information to all the nodes that are on the RSVP P2MP LSP and send the mLDP mapping messages include:

sending a distribution message that includes the FEC information and the label of the FEC information to an intermediate node, so that the intermediate node sends, after replicating the distribution message, the distribution message to all the nodes that are on the RSVP P2MP LSP and send the mLDP mapping messages; or after connections are established to all the nodes that are on the RSVP P2MP LSP and send the mLDP mapping messages, sending a distribution message directly to all the nodes that are on the RSVP P2MP LSP and send the mLDP mapping messages, so that all the nodes that send the mLDP mapping messages use the label of the FEC information as an incoming label of packet forwarding entries of the nodes.

With reference to the first aspect, or the first possible implementation manner of the first aspect, or the second possible implementation manner of the first aspect, in a third possible implementation manner, the generating a packet forwarding entry of a local node according to an mLDP label of the local node, the RSVP P2MP LSP, and the label of the FEC information includes:

associating the mLDP label of the local node with the RSVP P2MP LSP and the label of the FEC information, and generating the packet forwarding entry of the local node, where the mLDP label of the local node is set as an incoming label, and an RSVP label of a downstream node that sends the mLDP mapping message is set as an outgoing label, where the RSVP label of the downstream node that sends the mLDP mapping message is allocated when the RSVP P2MP LSP is established.

With reference to the first aspect, or the first possible implementation manner of the first aspect to the third possible implementation manner of the first aspect, in a fourth possible implementation manner, the method further includes:

receiving a multi-protocol label switching packet from an upstream node, where the multi-protocol label switching packet is encapsulated by the user-side root node by using an mLDP label of the local node;

removing the mLDP label of the local node from the multi-protocol label switching packet;

replicating the multi-protocol label switching packet with the mLDP label removed, where the number of replicated multi-protocol label switching packets is equal to the number of outgoing labels in the packet forwarding entry of the local node; and encapsulating the replicated multi-protocol label switching packet by using the label of the FEC information and an RSVP label of a downstream node that sends an mLDP mapping message, where the label of the FEC information is used as an inner label, and the RSVP label of the downstream node that sends the mLDP mapping message is used as an outer label, and sending the multi-protocol label switching packet to the downstream node corresponding to the RSVP label of the downstream node that sends the mLDP mapping message.

According to a second aspect, a method for implementing point-to-multipoint multicast is provided, where the method includes:

receiving an mLDP mapping message, which is sent by a user-side leaf node and forwarded by at least one network-side leaf node;

performing snooping on the received mLDP mapping message to acquire, from the mLDP mapping message, FEC information and an mLDP label of a user-side leaf node to which the mLDP mapping message belongs;

acquiring a Resource Reservation Protocol point-to-multipoint path RSVP P2MP LSP according to the network-side leaf nodes;

allocating a label to the FEC information, and sending the label of the FEC information to all the nodes that are on the RSVP P2MP LSP and forward the mLDP mapping messages;

generating a packet forwarding entry of the local node according to an mLDP label in the $1^{st}$ mLDP mapping message received by the local node, the RSVP P2MP LSP, and the label of the FEC information; and forwarding the $1^{st}$ mLDP mapping message among received mLDP mapping messages that belong to the same FEC information, to an upstream node.

With reference to the second aspect, in a first possible implementation manner, the method further includes:

receiving a multi-protocol label switching packet from an upstream node, where the multi-protocol label switching packet is encapsulated by a user-side root node by using the mLDP label of the user-side leaf node;

removing the mLDP label of the user-side leaf node from the multi-protocol label switching packet;

replicating the multi-protocol label switching packet with the mLDP label removed, where the number of replicated multi-protocol label switching packets is equal to the number of outgoing labels in the packet forwarding entry of the network-side root node; and encapsulating the replicated multi-protocol label switching packet by using the label of the FEC information and an RSVP label of a downstream node that forwards the mLDP mapping message, where the label of the FEC information is used as an inner label, and the RSVP label of the downstream node that forwards the mLDP mapping message is used as an outer label, and sending the multi-protocol label switching packet to the downstream node corresponding to the RSVP label of the node.

According to a third aspect, a method for implementing point-to-multipoint multicast is provided, where the method includes:

receiving a distribution message that includes FEC information and a label of the FEC information from an upstream network-side root node;

sending a response message to the network-side root node; and using the label of the FEC information as an incoming label of a packet forwarding entry of a local node.

With reference to the third aspect, in a first possible implementation manner, the receiving a distribution message that includes FEC information and a label of the FEC information from an upstream network-side root node includes:

receiving, from an intermediate node, the distribution message sent by the network-side root node; or after a connection is established to the network-side root node on an RSVP P2MP LSP, receiving the distribution message directly from the network-side root node.

With reference to the third aspect or the first possible implementation manner of the third aspect, in a second possible implementation manner, the method further includes:

receiving a multi-protocol label switching packet from the upstream network-side root node;

removing an RSVP label of the local node from the multi-protocol label switching packet, and removing the label of the FEC information from a replicated multi-protocol label switching packet, where the RSVP label of the local node is allocated when the local node establishes the RSVP P2MP LSP to the network-side root node;

replicating the multi-protocol label switching packet with the RSVP label and the label of the FEC information removed, where the number of replicated multi-protocol label switching packets is determined according to the number of mLDP labels of downstream nodes corresponding to the label of the FEC information; and encapsulating the replicated multi-protocol label switching packet by using an mLDP label in an mLDP mapping message sent by a downstream node, and sending the multi-protocol label switching packet to the downstream node corresponding to the mLDP label of the downstream node.

According to a fourth aspect, a network node is provided, where the node includes:

a first receiving unit, configured to receive an mLDP mapping message from at least one downstream node, where each mLDP mapping message includes forwarding equivalence class FEC information and an mLDP label of a node to which the mLDP mapping message belongs, and send each mLDP mapping message to a first label allocating unit and a first entry creating unit;

a first path acquiring unit, configured to acquire an RSVP P2MP LSP according to the downstream nodes that send the mLDP mapping messages, and send information about the RSVP P2MP LSP to the first label allocating unit and the first entry creating unit;

the first label allocating unit, configured to receive each mLDP mapping message from the first receiving unit, receive the information about the RSVP P2MP LSP from the first path acquiring unit, allocate a label to the FEC information, and send the label of the FEC information to all the nodes that are on the RSVP P2MP LSP and send the mLDP mapping messages;

the first entry creating unit, configured to receive each mLDP mapping message from the first receiving unit, receive the information about the RSVP P2MP LSP from the first path acquiring unit, and according to an mLDP label of the local node, the RSVP P2MP LSP, and the label of the FEC information, generate a packet forwarding entry of the local node; and a first sending unit, configured to send a new mLDP mapping message to an upstream node, where the new mLDP mapping message includes the FEC information and the mLDP label of the local node, and the FEC information includes an address of a user-side root node.

With reference to the fourth aspect, in a first possible implementation manner, the first path acquiring unit is specifically configured to:

search for an existing RSVP P2MP LSP according to the downstream nodes that send the mLDP mapping messages; or establish the RSVP P2MP LSP according to the downstream nodes that send the mLDP mapping messages, where the RSVP P2MP LSP includes all the downstream nodes that send the mLDP mapping messages.

With reference to the fourth aspect or the first possible implementation manner of the fourth aspect, in a second possible implementation manner, the first label allocating unit is specifically configured to:

send a distribution message that includes the FEC information and the label of the FEC information to an intermediate node, so that the intermediate node sends, after replicating the distribution message, the distribution message to all the nodes that are on the RSVP P2MP LSP and send the mLDP mapping messages; or after connections are established to all the nodes that are on the RSVP P2MP LSP and send the mLDP mapping messages, send a distribution message directly to all the nodes that are on the RSVP P2MP LSP and send the mLDP mapping messages, so that all the nodes that send the mLDP mapping messages use the label of the FEC information as an incoming label of packet forwarding entries of the nodes.

With reference to the fourth aspect, or the first possible implementation manner of the fourth aspect, or the second possible implementation manner of the fourth aspect, in a third possible implementation manner, the first entry creating unit is specifically configured to:

associate the mLDP label of the local node with the RSVP P2MP LSP and the label of the FEC information, and generate the packet forwarding entry of the local node, where the mLDP label of the local node is set as an incoming label, and an RSVP label of a downstream node that sends the mLDP mapping message is set as an outgoing label, where the RSVP label of the downstream node that sends the mLDP mapping message is allocated when the RSVP P2MP LSP is established.

With reference to the fourth aspect, or any one of the first possible implementation manner of the fourth aspect to the third possible implementation manner of the fourth aspect, in a fourth possible implementation manner, the first receiving unit, further configured to receive a multi-protocol label switching packet from an upstream node, where the multi-protocol label switching packet is encapsulated by the user-side root node by using an mLDP label of the local node; and the node further includes:

a first label processing unit, configured to remove the mLDP label of the local node from the multi-protocol label switching packet, and send the multi-protocol label switching packet with the mLDP label removed, to a first packet replicating unit; and the first packet replicating unit, configured to receive, from the first label processing unit, the multi-protocol label switching packet with the mLDP label removed, replicate the multi-protocol label switching packet with the mLDP label removed, where the number of replicated multi-protocol label switching packets is equal to the number of outgoing labels in the packet forwarding entry of the local node, and send the replicated multi-protocol label switching packets to the first label processing unit, where the first label processing unit is further configured to receive the replicated multi-protocol label switching packets from the first packet replicating unit, encapsulate the replicated multi-protocol label switching packet by using the label of the FEC information and an RSVP label of a downstream node that sends an mLDP mapping message, where the label of the FEC information is used as an inner label, and the RSVP label of the downstream node that sends the mLDP mapping message is used as an outer label, and send, by using the first sending unit, the multi-protocol label switching packet to the downstream node corresponding to the RSVP label of the downstream node that sends the mLDP mapping message.

According to a fifth aspect, a network node is provided, where the node includes:

a second receiving unit, configured to receive an mLDP mapping message, which is sent by a user-side leaf node and forwarded by at least one downstream node, and send the received mLDP mapping message to a message snooping unit;

the message snooping unit, configured to receive the mLDP mapping message from the second receiving unit, perform snooping on the received mLDP mapping message to acquire, from the mLDP mapping message, FEC information and an mLDP label of the user-side leaf node to which the mLDP mapping message belongs, and send the message undergoing the snooping to a second label allocating unit and a second entry creating unit;

a second path acquiring unit, configured to acquire a Resource Reservation Protocol point-to-multipoint path RSVP P2MP LSP;

the second label allocating unit, configured to receive, from the second receiving unit, the message undergoing the snooping, allocate a label to the FEC information, and send the label of the FEC information to all the nodes that forward the mLDP mapping message and are on the RSVP P2MP LSP;

the second entry creating unit, configured to receive, from the second receiving unit, the message undergoing the snooping, and according to an mLDP label in the 1st mLDP mapping message received by the local node, the RSVP P2MP LSP, and the label of the FEC information, generate a packet forwarding entry of the local node; and a second sending unit, configured to forward the 1st mLDP mapping message among received mLDP mapping messages that belong to the same FEC information, to an upstream node.

With reference to the fifth aspect, in a first possible implementation manner, the second entry creating unit is specifically configured to:

associate the mLDP label in the 1st mLDP mapping message received by the local node with the RSVP P2MP LSP and the label of the FEC information, and generate the packet forwarding entry of the network-side root node, where the mLDP label in the 1st mLDP mapping message received by the local node is set as an incoming label, and an RSVP label of a downstream node that forwards the mLDP mapping message is set as an outgoing label, where the RSVP label of the lower-level node of the local node is allocated when the RSVP P2MP LSP is established.

With reference to the fifth aspect or the first possible implementation manner of the fifth aspect, in a second possible implementation manner, the method further includes:

the second receiving unit, further configured to receive a multi-protocol label switching packet from an upstream node, where the multi-protocol label switching packet is encapsulated by a user-side root node by using the mLDP label of the user-side leaf node;

a second label processing unit, configured to remove the mLDP label of the user-side leaf node from the multi-protocol label switching packet, and send the multi-protocol label switching packet with the mLDP label removed, to a second packet replicating unit; and the second packet replicating unit, configured to receive, from the second label processing unit, the multi-protocol label switching packet with the mLDP label removed, replicate the multi-protocol label switching packet with the mLDP label removed, where the number of replicated multi-protocol label switching packets is equal to the number of outgoing labels in the packet forwarding entry of a network-side root node, and send the replicated multi-protocol label switching packets to the second label processing unit, where:

the second label processing unit is further configured to receive the replicated multi-protocol label switching packets from the second packet replicating unit, encapsulate the replicated multi-protocol label switching packet by using the label of the FEC information and the RSVP label of the downstream node that forwards the mLDP mapping message, where the label of the FEC information is used as an inner label, and the RSVP label of the downstream node that forwards the mLDP mapping message is used as an outer label, and send the multi-protocol label switching packet to the downstream node corresponding to the RSVP label of the node.

According to a sixth aspect, a network node is provided, where the node includes:

a third receiving unit, configured to receive, from an upstream node a distribution message, wherein the distribution message includes FEC information and a label of the FEC information, and send the distribution message to a third label processing unit;

a third sending unit, configured to send a response message to the upstream node that sends the distribution message; and the third label processing unit, configured to receive the distribution message from the third receiving unit, and use the label of the FEC information as an incoming label of a packet forwarding entry of the local node.

With reference to the sixth aspect, in a first possible implementation manner, the third receiving unit is specifically configured to:

receive, from an intermediate node, the distribution message sent by the network-side root node; or after a connection is established to the network-side root node on an RSVP P2MP LSP, receive the distribution message directly from the network-side root node.

With reference to the sixth aspect or the first possible implementation manner of the sixth aspect, in a second possible implementation manner, the method further includes:

the third receiving unit, further configured to receive a multi-protocol label switching packet from the upstream network-side root node;

the third label processing unit, further configured to remove an RSVP label of the local node from the multi-protocol label switching packet, and remove the label of the FEC information from a replicated multi-protocol label switching packet, where the RSVP label of the local node is allocated when the RSVP P2MP LSP is established;

a third packet replicating unit, configured to replicate the multi-protocol label switching packet with the RSVP label and the label of the FEC information removed, where the number of replicated multi-protocol label switching packets is determined according to the number of mLDP labels of downstream nodes corresponding to the label of the FEC information, and send the replicated multi-protocol label switching packets to the third label processing unit; and the third label processing unit, further configured to receive the replicated multi-protocol label switching packets from the third packet replicating unit, encapsulate the replicated multi-protocol label switching packet by using an mLDP label in an mLDP mapping message sent by a downstream node, and send, by using the third sending unit, the multi-protocol label switching packet to the downstream node corresponding to the mLDP label of the downstream node.

Embodiments of the present invention provide a method for implementing point-to-multipoint multicast, a network node, and a system. A network-side root node acquires an RSVP P2MP LSP, allocates a label value to received FEC information, and associates a forwarding entry of each network-side leaf node with the label value of the FEC information; meanwhile, the network-side root node sends an mLDP label of the network-side root node and the FEC information to an upstream user-side leaf node by using an mLDP mapping message, and associates the mLDP label of the network-side root node with the RSVP P2MP LSP and the label of the FEC information. Alternatively, the network-side root node acquires FEC information and an mLDP label by performing snooping, and acquires an RSVP P2MP LSP, and then allocates a label value to the received FEC information, and associates a forwarding entry of each network-side leaf node with the label of the FEC information; meanwhile, the network-side root node transparently transmits a first received mLDP mapping message to an upstream node, and associates an mLDP label in the mLDP mapping message with the RSVP P2MP LSP and the label of the FEC information. In this way, an mLDP over RSVP point-to-multipoint multicast path is established, which is applicable to P2MP multicast in a non-VPN scenario. Because the node may perform snooping to acquire FEC information and an mLDP label of a downstream node from an mLDP mapping message, it is not necessary for each node to completely support mLDP, so that deployment can also be implemented when a node does not support mLDP. Further, during packet forwarding, excessive packet replication can be avoided, and bandwidth resources can be saved. In addition, message suppression processing is performed on mLDP mapping messages that include the same FEC information, which further saves bandwidth and reduces processing load of the node.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
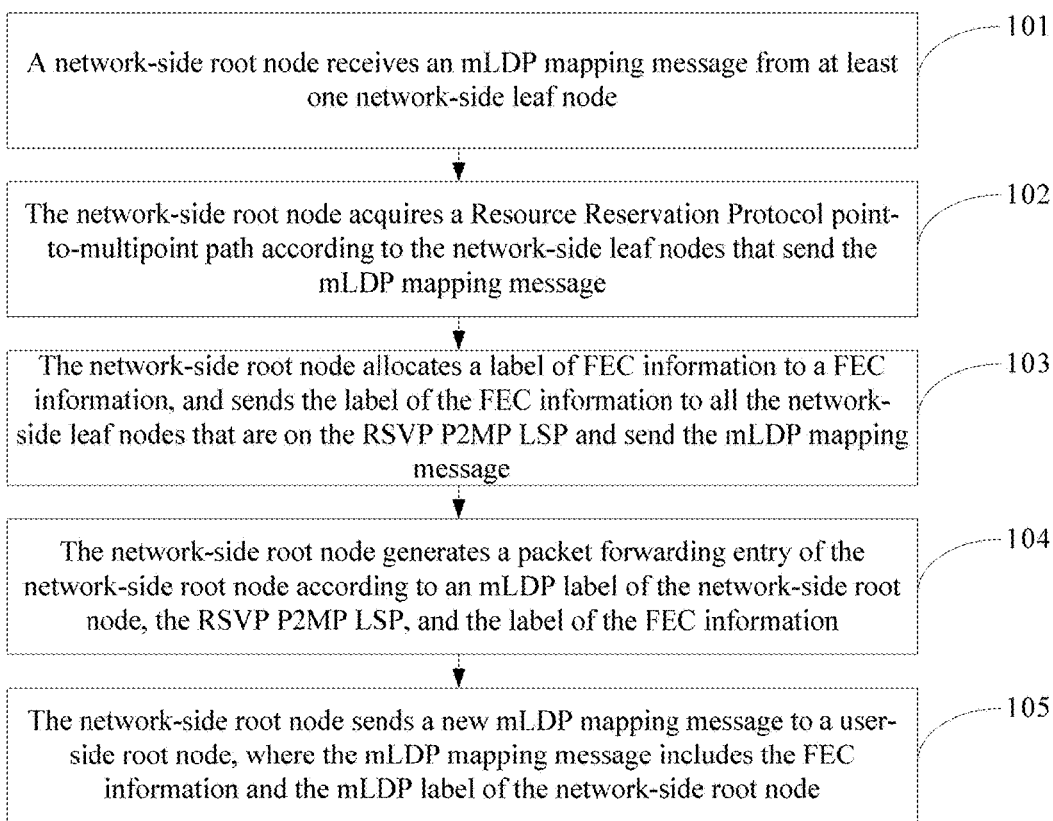
FIG. 1 is a first schematic flowchart of a method for implementing point-to-multipoint multicast according to an embodiment of the present invention.

A multicast source communicates with multicast receivers by using a network running mLDP and a network running RSVP. The network running RSVP includes a multicast source-oriented PE node, which is referred to as a network-side root node, and further includes multicast receivers-oriented PE nodes, which are referred to as network-side leaf nodes. The network-side root node communicates with the multicast source by using the network running mLDP. The network-side leaf nodes communicate with the multicast receivers by using the network running mLDP. A PE node that is in the network running mLDP and is oriented to the multicast source is referred to as a user-side root node, and PE nodes that are in the network running mLDP and are oriented to the multicast receivers are referred to as user-side leaf nodes. An embodiment of the present invention provides a method for implementing point-to-multipoint multicast. As shown in FIG. 1, the method includes:

101. The network-side root node receives an mLDP mapping message from at least one downstream network-side leaf node, where each mLDP mapping message includes forwarding equivalence class (FEC) information and an mLDP label of a network-side leaf node that sends the mLDP mapping message; and the FEC information includes an address of the user-side root node.

For example, the network running RSVP includes three network-side leaf nodes, and the network-side root node receives three mLDP mapping messages, where each mLDP mapping message includes the same FEC information.

102. The network-side root node acquires a Resource Reservation Protocol point-to-multipoint path (RSVP P2MP LSP) according to the network-side leaf node that sends the mLDP mapping message.

103. The network-side root node allocates a label of FEC information to the FEC information, and sends the label of the FEC information to all the network-side leaf nodes that are on the RSVP P2MP LSP and send the mLDP mapping messages.

For example, when three mLDP mapping messages are received in the foregoing 101, where each mLDP mapping message includes the same FEC information, the network-side root node allocates a label to the FEC information.

104. The network-side root node generates a packet forwarding entry of the network-side root node according to an mLDP label of the network-side root node, the RSVP P2MP LSP, and the label of the FEC information.

105. The network-side root node sends a new mLDP mapping message to the upstream user-side root node, where the new mLDP mapping message includes the FEC information and the mLDP label of the network-side root node, and the FEC information includes the address of the user-side root node.

Figure 2:
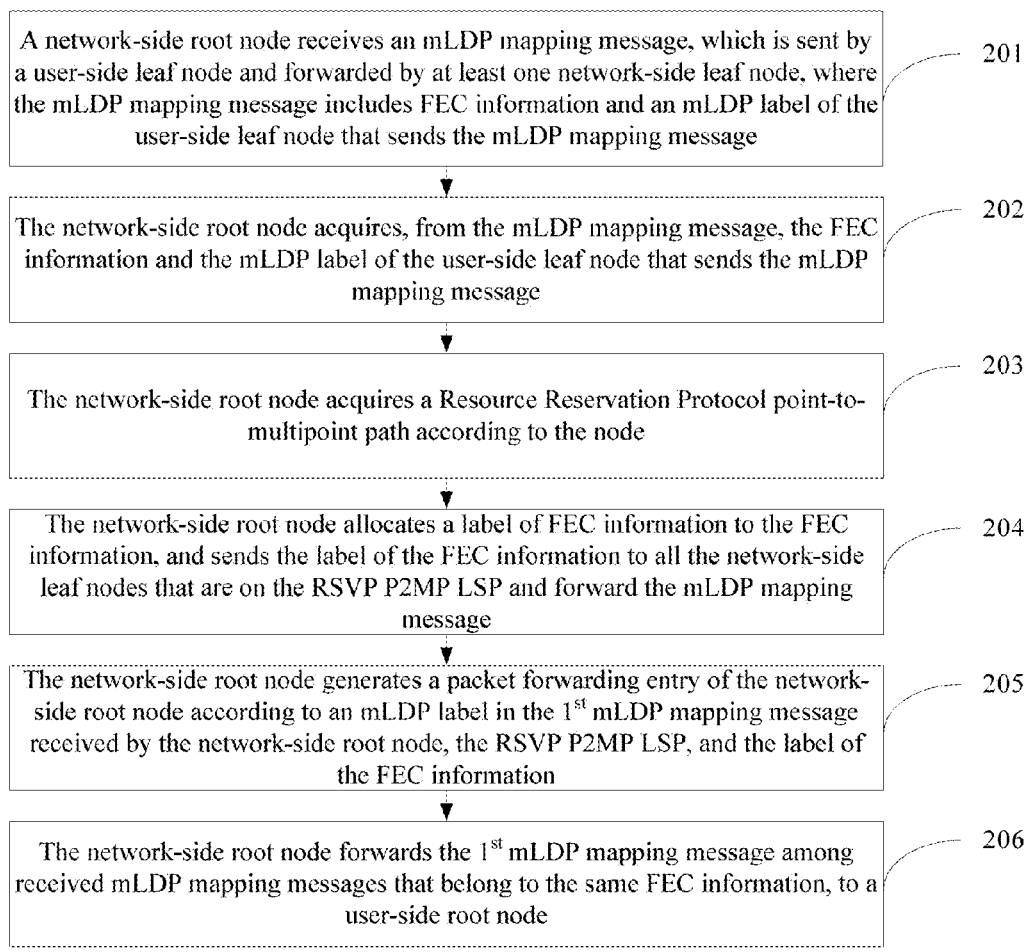
FIG. 2 is a second schematic flowchart of a method for implementing point-to-multipoint multicast according to an embodiment of the present invention.

An embodiment of the present invention provides another method for implementing point-to-multipoint multicast. As shown in FIG. 2, based on a network-side root node, the method includes:

201. The network-side root node receives an mLDP mapping message, which is sent by a user-side leaf node and forwarded by at least one network-side leaf node, where the mLDP mapping message includes FEC information and an mLDP label of the user-side leaf node that sends the mLDP mapping message.

202. The network-side root node acquires, from the mLDP mapping message, the FEC information and the mLDP label of the user-side leaf node that sends the mLDP mapping message.

203. The network-side root node acquires a Resource Reservation Protocol point-to-multipoint path (RSVP P2MP LSP) according to the user-side leaf node that sends the mLDP mapping message.

For example, when a network-side leaf node transparently transmits an mLDP mapping message, the network-side leaf node may notify the network-side root node by using a protocol message to indicate that the network-side leaf node is a leaf node, for example, by using a BGP protocol-based RSVP P2MP leaf discovery technology or by using the distribution protocol described in this specification.

204. The network-side root node allocates a label of FEC information to the FEC information, and sends the label of the FEC information to all the network-side leaf nodes that are on the RSVP P2MP LSP and forward the mLDP mapping message.

205. The network-side root node generates a packet forwarding entry of the network-side root node according to an mLDP label in the 1st mLDP mapping message received by the network-side root node, the RSVP P2MP LSP, and the label of the FEC information.

206. The network-side root node forwards the first mLDP mapping message among received mLDP mapping messages that belong to the same FEC information, to a user-side root node.

Figure 3:
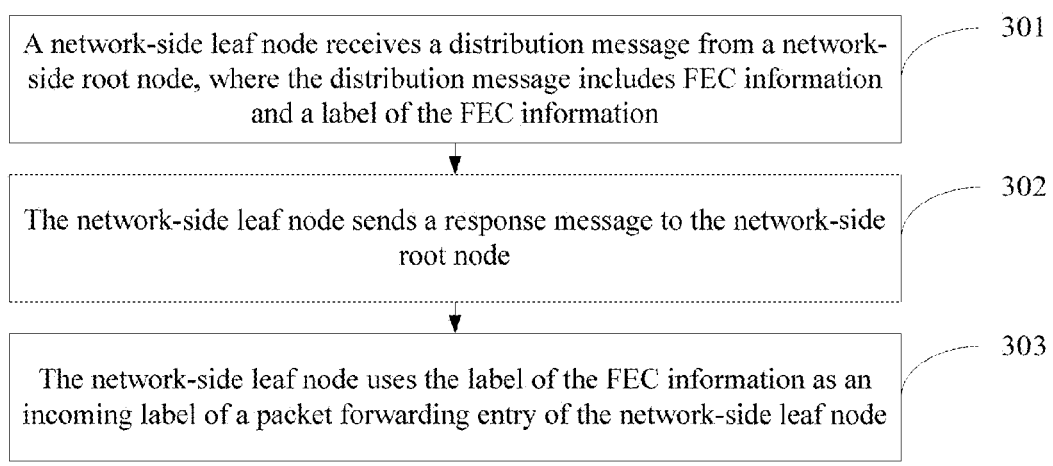
FIG. 3 is a third schematic flowchart of a method for implementing point-to-multipoint multicast according to an embodiment of the present invention.

An embodiment of the present invention provides a method for implementing point-to-multipoint multicast. As shown in FIG. 3, based on a network-side leaf node, the method includes:

301. The network-side leaf node receives a distribution message from a network-side root node, where the distribution message includes FEC information and a label of the FEC information.

302. The network-side leaf node sends a response message to the network-side root node.

303. The network-side leaf node uses the label of the FEC information as an incoming label of a packet forwarding entry of the network-side leaf node.

The embodiment of the present invention provides a method for implementing point-to-multipoint multicast. A network-side root node acquires an RSVP P2MP LSP, allocates a label to received FEC information, and associates a forwarding entry of each network-side leaf node with the label of the FEC information; meanwhile, the network-side root node sends an mLDP label of the network-side root node and the FEC information to an upstream user-side leaf node by using an mLDP mapping message, and associates the mLDP label of the network-side root node with the RSVP P2MP LSP and the label of the FEC information. Alternatively, the network-side root node acquires FEC information and an mLDP label by snooping, acquires an RSVP P2MP LSP, then allocates a label to received FEC information, and associates a forwarding entry of each network-side leaf node with the label of the FEC information; meanwhile, the network-side root node transparently transmits the 1st received mLDP mapping message to a user-side root node, and associates an mLDP label in the mLDP mapping message with the RSVP P2MP LSP and the label of the FEC information. In this way, an mLDP over RSVP point-to-multipoint multicast path is established, which is applicable to P2MP multicast in a non-VPN scenario. Because the node can acquire FEC information and an mLDP label of a downstream node from the mLDP mapping message by performing snooping on an mLDP mapping message, it is not necessary for each node to completely support mLDP, so that deployment can also be implemented when a node does not support mLDP. Further, during packet forwarding, excessive packet replication can be avoided, and bandwidth resources can be saved. In addition, message suppression processing is performed on mLDP mapping messages that include the same FEC information, which further saves bandwidth and reduces processing load of the node.

Figure 4:
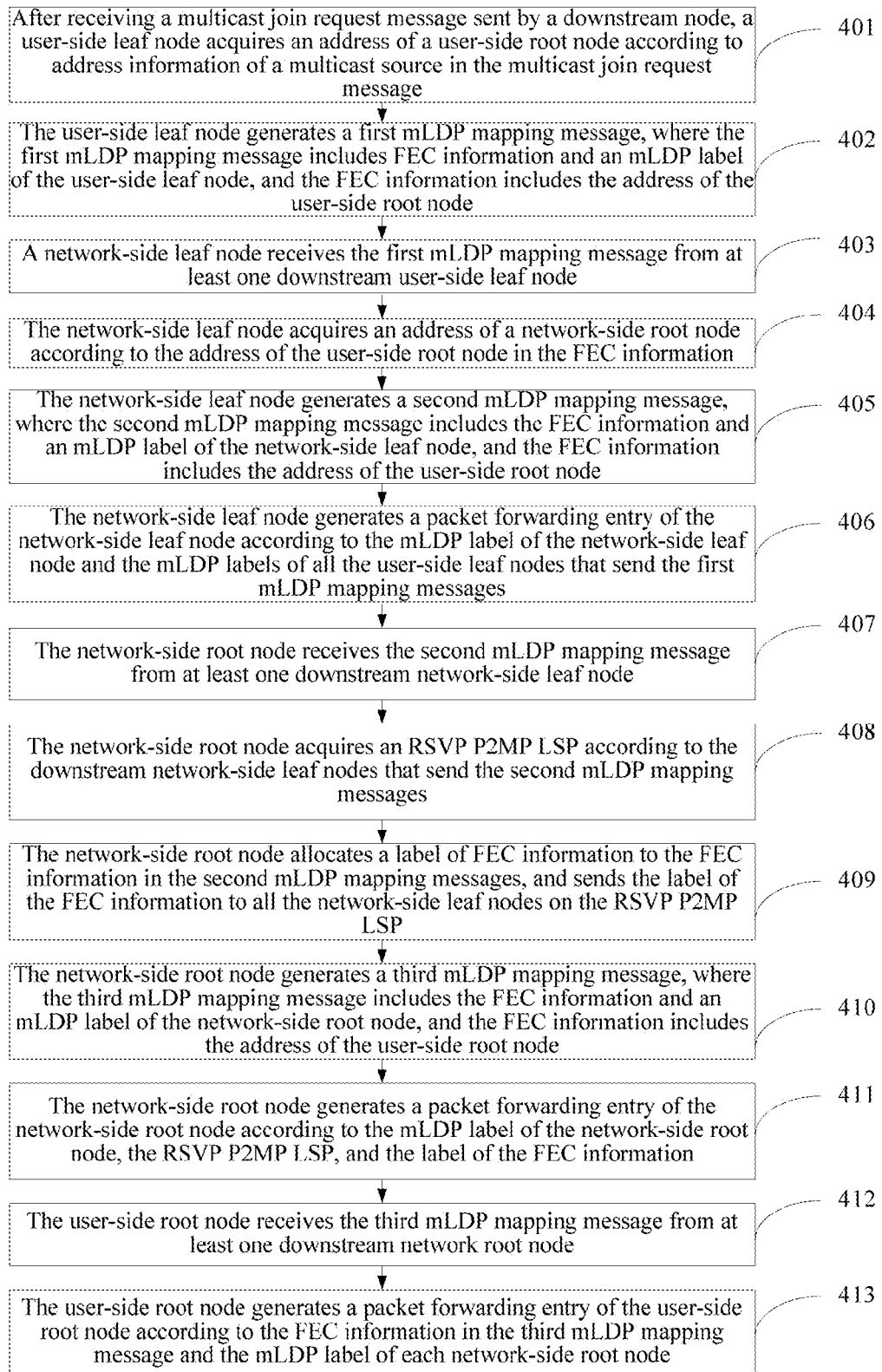
FIG. 4 is a first schematic flowchart of a method for implementing point-to-multipoint multicast according to another embodiment of the present invention.

Another embodiment of the present invention provides a method for implementing point-to-multipoint multicast. It is assumed that: an upper-level node of a user-side leaf node is a network-side leaf node, an upper-level node of the network-side leaf node is a network-side root node, and an upper-level node of the network-side root node is a user-side root node. As shown in FIG. 4, the method includes:

401. After receiving a multicast join request message sent by a downstream node, a user-side leaf node acquires an address of a user-side root node according to address information of a multicast source in the multicast join request message.

Specifically, the user-side leaf node may be, for example, a U-PE (leaf) node, where the U-PE refers to User-Provider Edge (user-side edge device). After receiving the multicast join request message sent by the downstream node, for example, PIM-SSM join, the U-PE (leaf) node initiates establishment of an mLDP P2MP LSP, and according to a source address in a multicast protocol, may perform internal iteration based on a routing table to obtain the address of the user-side root node, which may be, for example, an address of a U-PE (root) node.

402. The user-side leaf node generates a first mLDP mapping message, where the first mLDP mapping message includes FEC information and an mLDP label of the user-side leaf node, and the FEC information includes the address of the user-side root node.

Exemplarily, the U-PE (leaf) node first allocates an mLDP label to the U-PE (leaf) node itself, and then constructs a first mLDP mapping message, where the first mLDP mapping message includes the FEC information and the mLDP label of the U-PE (leaf) node, and the FEC information may include the address of the U-PE (root) node.

After generating the first mLDP mapping message, the user-side leaf node may send the first mLDP mapping message to an upstream network-side leaf node. The network-side leaf node may be an N-PE (leaf) node, where the N-PE refers to Net-Provider Edge (network-side edge device).

403. The network-side leaf node receives the first mLDP mapping message from at least one downstream user-side leaf node.

Exemplarily, because of point-to-multipoint, the N-PE (leaf) node may have multiple downstream U-PE (leaf) nodes. Therefore, the first mLDP mapping messages received by the N-PE (leaf) node may be sent by multiple U-PE (leaf) nodes. A first mLDP mapping message sent by each U-PE (leaf) node includes the FEC information and an mLDP label value of the U-PE (leaf) that sends the first mLDP mapping message, and the FEC information includes the address of the U-PE (root) node.

404. The network-side leaf node acquires an address of a network-side root node according to the address of the user-side root node in the FEC information.

Exemplarily, the N-PE (leaf) node may perform iteration according to the address of the U-PE (root) node in the FEC information and routing table information to obtain the address of the network-side root node, where the network-side root node may be an N-PE (root) node.

405. The network-side leaf node generates a second mLDP mapping message, where the second mLDP mapping message includes the FEC information and an mLDP label of the network-side leaf node, and the FEC information includes the address of the user-side root node.

Exemplarily, the N-PE (leaf) node first allocates an mLDP label to the N-PE (leaf) node itself, and then constructs a second mLDP mapping message, where the second mLDP mapping message includes the FEC information and the mLDP label of the N-PE (leaf) node, and the FEC information may include the address of the U-PE (root) node.

After generating the second mLDP mapping message, the network-side leaf node may send the second mLDP mapping message to the upstream network-side root node. It should be noted that, the upstream node of the network-side leaf node may be not the network-side root node, for example, it may be an intermediate node; in this case, the second mLDP mapping message needs to be first sent to the intermediate node, and then is forwarded by the intermediate node to the upstream node layer by layer until the second mLDP mapping message arrives at the network-side root node.

406. The network-side leaf node generates a packet forwarding entry of the network-side leaf node according to the mLDP label of the network-side leaf node and the mLDP labels of all the user-side leaf nodes that send the first mLDP mapping messages.

Exemplarily, the mLDP label of the N-PE (leaf) node may be set as an incoming label, and the mLDP labels of all the U-PE (leaf) nodes that send the first mLDP mapping messages are set as outgoing labels, so that a packet forwarding entry of the N-PE (leaf) node is generated. It should be noted that, sending the second mLDP mapping message to the upstream N-PE (root) node and creating the packet forwarding entry of the local node may be performed at the same time.

407. The network-side root node receives the second mLDP mapping message from at least one downstream network-side leaf node.

Exemplarily, the network-side root node may be the N-PE (root) node. Because of point-to-multipoint, the N-PE (root) node may have multiple downstream N-PE (leaf) nodes. Therefore, the second mLDP mapping messages received by the N-PE (root) node may be sent by multiple N-PE (leaf) nodes. The second mLDP mapping message sent by each N-PE (leaf) node includes the FEC information and an mLDP label value of the N-PE (leaf) that sends the second mLDP mapping message, and the FEC information includes the address of the U-PE (root) node.

408. The network-side root node acquires an RSVP P2MP LSP according to the downstream network-side leaf nodes that send the second mLDP mapping messages.

Specifically, the network-side root node may search for an existing RSVP P2MP LSP or establish an RSVP P2MP LSP, where the RSVP P2MP LSP includes all the network-side leaf nodes that send the second mLDP mapping messages.

Exemplarily, the N-PE (root) node may first search for a proper RSVP P2MP LSP among existing RSVP P2MP LSPs, where the RSVP P2MP LSP can include all the downstream N-PE (leaf) nodes that send the second mLDP mapping messages. If no RSVP P2MP LSP meeting the foregoing condition exists among the existing RSVP P2MP LSPs, a new RSVP P2MP LSP is established, so that the new RSVP P2MP LSP can include all the downstream N-PE (leaf) nodes that send the second mLDP mapping messages.

409. The network-side root node allocates a label of FEC information to the FEC information in the second mLDP mapping messages, and sends the label of the FEC information to all the network-side leaf nodes on the RSVP P2MP LSP.

Exemplarily, after finding or establishing the proper RSVP P2MP LSP, the N-PE (root) node allocates a label of FEC information to the FEC information in the second mLDP mapping messages, where the label of the FEC information is an index value of the FEC information. It should be noted that, one label is allocated to one piece of FEC information. Therefore, if the second mLDP mapping messages sent by the downstream N-PE (leaf) nodes include same FEC information, one label of FEC information is allocated to the same FEC information. If the second mLDP mapping messages sent by the downstream N-PE (leaf) nodes include different FEC information, the number of allocated labels of FEC information is equal to the number of pieces of different FEC information.

After allocating the label to the FEC information is completed, the network-side root node sends the label of the FEC information to all the downstream network-side leaf nodes on the RSVP P2MP LSP. For example, a specific implementation manner may be as follows:

In a first manner, the network-side root node sends a distribution message to an intermediate node, and then the intermediate node sends, after replicating the distribution message, the distribution message to all the N-PE (leaf) nodes on the RSVP P2MP LSP. An advantage of this manner is that the N-PE (root) node needs only to send one distribution message to the downstream. The distribution message includes the FEC information and the label of the FEC information.

Alternatively, in a second manner, the N-PE (root) node may separately establish connections to all the N-PE (leaf) nodes on the RSVP P2MP LSP, and after the connections are established, directly send the distribution message in a unicast manner to all the N-PE (leaf) nodes on the RSVP P2MP LSP, so that all the N-PE (leaf) nodes replace the mLDP labels of the nodes in the packet forwarding entries of the nodes with the received label of the FEC information, and the label of the FEC information is used as an incoming label of the packet forwarding entries of the N-PE (leaf) nodes.

After an N-PE (leaf) node receives the label of the FEC information, the N-PE (leaf) node returns a response message to the N-PE (root) node, notifying that the N-PE (leaf) node has received the label of the FEC information. If any N-PE (leaf) node does not return a response message, the N-PE (root) node resends the distribution message to that N-PE (leaf) node, to ensure that all the N-PE (leaf) nodes on the RSVP P2MP LSP receive the label of the FEC information.

It should be noted that, an advantage of allocating a unified label of FEC information to all the N-PE (leaf) nodes on the RSVP P2MP LSP by the N-PE (root) node is that, upon reception of a packet from the upstream, the N-PE (root) needs only to send one packet to an intermediate node, which then replicates and forwards the packet to the downstream N-PE (leaf) nodes. In this way, during packet forwarding, excessive packet replication is avoided, and bandwidth resources are saved.

410. The network-side root node generates a third mLDP mapping message, where the third mLDP mapping message includes the FEC information and an mLDP label of the network-side root node, and the FEC information includes the address of the user-side root node.

Exemplarily, the N-PE (root) node first allocates an mLDP label to the N-PE (root) node itself, and then constructs a third mLDP mapping message, where the third mLDP mapping message includes the FEC information and the mLDP label of the N-PE (root) node, and the FEC information may include the address of the U-PE (root) node.

After generating the third mLDP mapping message, the N-PE (root) node may send the third mLDP mapping message to the upstream U-PE (root).

411. The network-side root node generates a packet forwarding entry of the network-side root node according to the mLDP label of the network-side root node, the RSVP P2MP LSP, and the label of the FEC information.

Exemplarily, the N-PE (root) node associates the mLDP label of the N-PE (root) node with the RSVP P2MP LSP and the label of the FEC information to generate a packet forwarding entry of the N-PE (root) node, where the mLDP label of the N-PE (root) node is set as an incoming label, and an RSVP label of a lower-level node of the N-PE (root) node on the RSVP P2MP LSP is set as an outgoing label, where the RSVP label of the N-PE (leaf) node is allocated when the N-PE (leaf) node establishes the RSVP P2MP LSP to the N-PE (root) node. It should be noted that, sending the third mLDP mapping message to the upstream U-PE (root) node and creating the packet forwarding entry of the local node may be performed at the same time.

412. The user-side root node receives the third mLDP mapping message from at least one downstream network root node.

Exemplarily, because of point-to-multipoint, the U-PE (root) node may have multiple downstream N-PE (root) nodes. Therefore, the third mLDP mapping messages received by the U-PE (root) node may be sent by multiple N-PE (root) nodes. The third mLDP mapping message sent by each N-PE (root) node includes the FEC information and an mLDP label value of the N-PE (root) that sends the third mLDP mapping message, and the FEC information includes the address of the U-PE (root) node.

413. The user-side root node generates a packet forwarding entry of the user-side root node according to the FEC information and the mLDP label of each network-side root node in the third mLDP mapping message.

In this way, establishment of a whole packet sending path is completed, and mLDP over RSVP P2MP (mLDP P2MP over RSVP P2MP) multicast in a non-VPN scenario is implemented. That is, simple deployment is achieved by using mLDP, and moreover, bandwidth reservation and resource saving are implemented by using RSVP.

Figure 5:
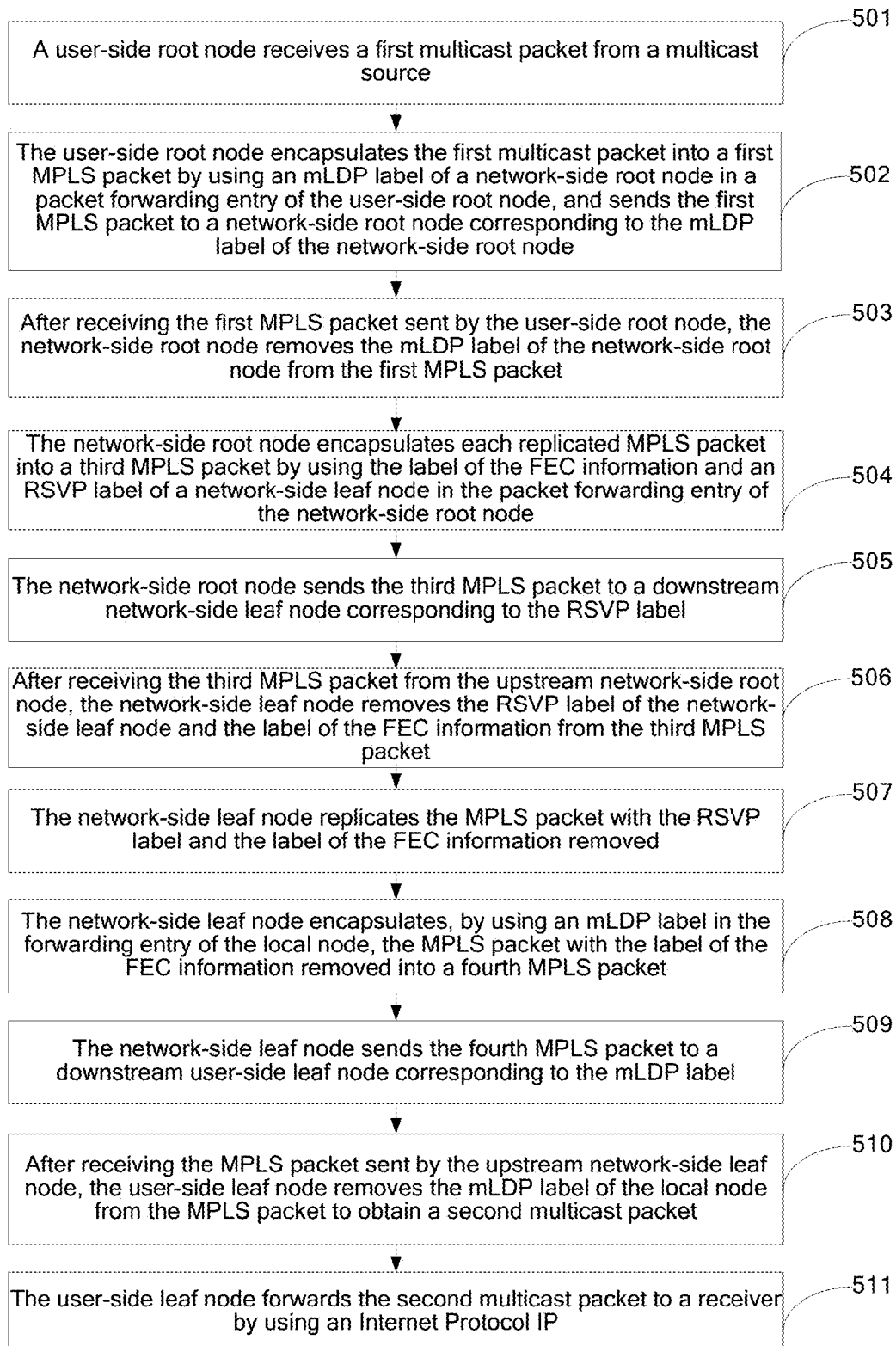
FIG. 5 is a second schematic flowchart of a method for implementing point-to-multipoint multicast according to another embodiment of the present invention.

In another aspect, at a data level, after the whole mLDP over RSVP P2MP multicast path is established, as shown in FIG. 5, the method further includes the following:

501. The user-side root node receives a first multicast packet from the multicast source.

502. The user-side root node encapsulates the first multicast packet into a first MPLS packet by using an mLDP label of the network-side root node in the packet forwarding entry of the user-side root node, and sends the first MPLS packet to the network-side root node corresponding to the mLDP label of the network-side root node.

Exemplarily, the U-PE (root) node encapsulates the first multicast packet into the first MPLS packet by using an outgoing label in the forwarding entry, namely, the mLDP label of the downstream N-PE (root) that sends the mLDP mapping message, and sends the encapsulated first MPLS packet to the downstream N-PE (root) node corresponding to the mLDP label of the N-PE (root) node.

It should be noted that, because the U-PE (root) node may have multiple downstream N-PE (root) nodes, the U-PE (root) node may simultaneously forward the first MPLS packet to the multiple downstream N-PE (root) nodes. It should be noted that, the U-PE (root) node sends one packet to each N-PE (root) node, which then replicates and forwards the packet according to the forwarding entry.

503. After receiving the first MPLS packet sent by the user-side root node, the network-side root node removes the mLDP label of the network-side root node from the first MPLS packet.

504. The network-side root node replicates a second MPLS packet with the mLDP label of the network-side root node removed. The replicated packets are determined according to the number of outgoing labels in the packet forwarding entry of the network-side root node.

504. The network-side root node encapsulates each replicated MPLS packet into a third MPLS packet by using the label of the FEC information and an RSVP label of a network-side leaf node in the packet forwarding entry of the network-side root node.

Specifically, the N-PE (root) node may encapsulate the label of the FEC information as an inner label of the MPLS packet, and encapsulate an RSVP label of an N-PE (leaf) node in the packet forwarding entry of the N-PE (root) node, namely, a downstream N-PE (leaf) node that sends an mLDP mapping message, as an outer label.

505. The network-side root node sends the third MPLS packet to the downstream network-side leaf node corresponding to the RSVP label.

506. After receiving the third MPLS packet from the upstream network-side root node, the network-side leaf node removes the RSVP label of the network-side leaf node and the label of the FEC information from the third MPLS packet.

507. The network-side leaf node replicates the MPLS packet with the RSVP label and the label of the FEC information removed.

Specifically, after removing the RSVP label of the local node from the MPLS packet, the N-PE (leaf) node may find, according to the inner label of the FEC information and by using the packet forwarding entry of the local node, mLDP labels of downstream U-PE (leaf) nodes corresponding to the label of the FEC information, and then replicate the MPLS packet according to these mLDP labels.

508. The network-side leaf node encapsulates the MPLS packet, with the label of the FEC information removed, into a fourth MPLS packet by using an mLDP label in the forwarding entry of the local node.

509. The network-side leaf node sends the fourth MPLS packet to a downstream user-side leaf node corresponding to the mLDP label.

510. After receiving the fourth MPLS packet sent by the upstream network-side leaf node, the user-side leaf node removes the mLDP label of the user-side leaf node from the fourth MPLS packet to obtain a second multicast packet.

511. The user-side leaf node forwards the second multicast packet to a receiver by using the Internet Protocol (IP).

The embodiment of the present invention provides a method for implementing point-to-multipoint multicast. A network-side leaf node acquires an mLDP label of a downstream user-side leaf node and FEC information from an mLDP mapping message of the downstream user-side leaf node, then sends an mLDP label of the network-side leaf node and the FEC information to an upstream network-side root node by using an mLDP mapping message, and generates a forwarding entry; then the network-side root node searches for or establishes an RSVP P2MP LSP, allocates a label value to the received FEC information, and associates a forwarding entry of each network-side leaf node with the label value of the FEC information; meanwhile, the network-side root node sends an mLDP label of the network-side root node and the FEC information to an upstream user-side leaf node by using an mLDP mapping message, and associates the mLDP label of the network-side root node with the RSVP P2MP LSP and the label of the FEC information. In this way, an mLDP over RSVP point-to-multipoint multicast path is established, which is applicable to P2MP multicast in a non-VPN scenario. Further, during packet forwarding, excessive packet replication is avoided, and bandwidth resources are saved.

Figure 6:
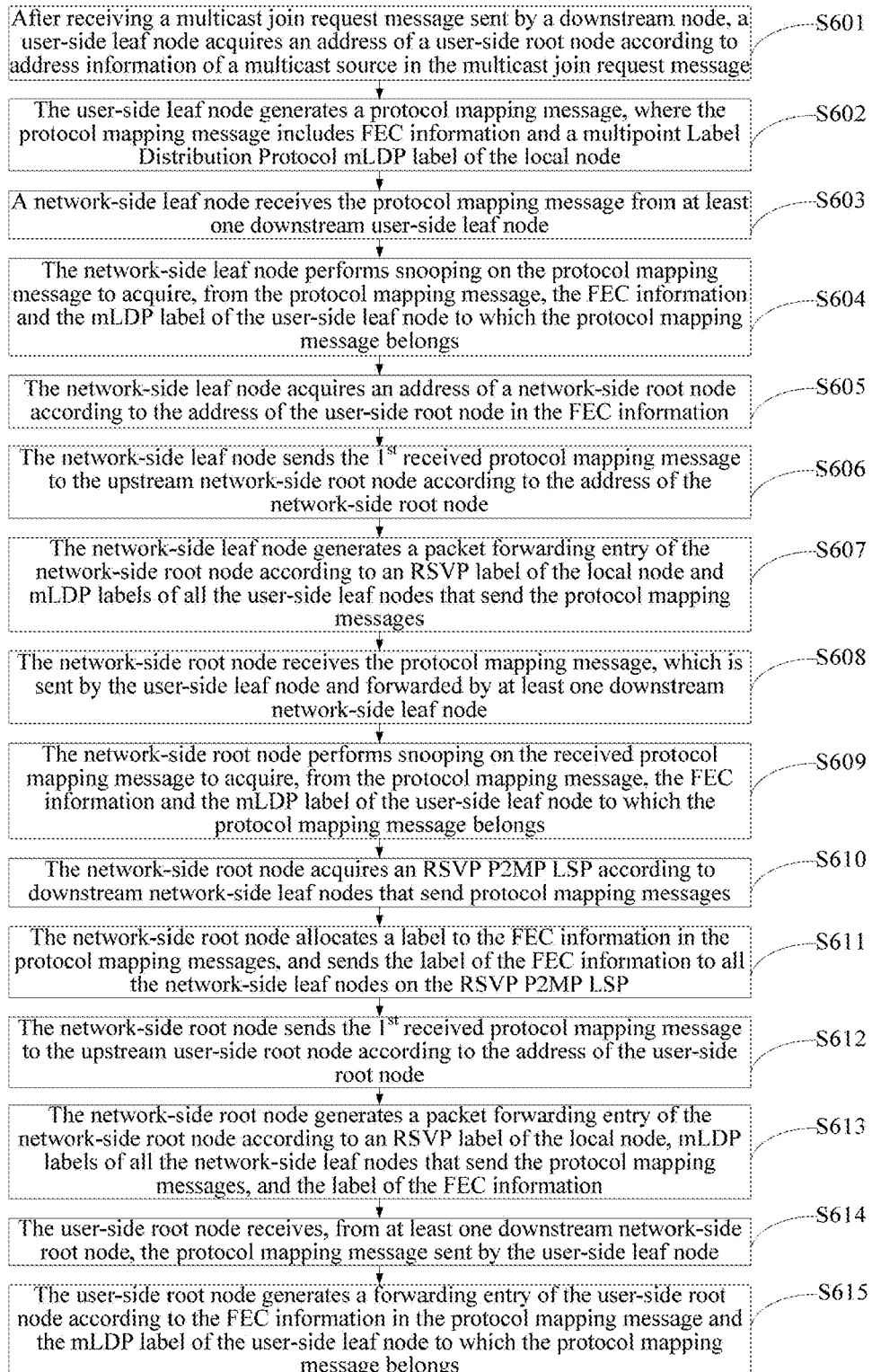
FIG. 6 is a third schematic flowchart of a method for implementing point-to-multipoint multicast according to another embodiment of the present invention.

Still another embodiment of the present invention provides a method for implementing point-to-multipoint multicast. As shown in FIG. 6, the method includes the following:

S601. After receiving a multicast join request message sent by a downstream node, a user-side leaf node acquires an address of a user-side root node according to address information of a multicast source in the multicast join request message (the step is the same as S401; reference may be made to S401, and details are not repeated any further).

S602. The user-side leaf node generates an mLDP mapping message, where the mLDP mapping message includes FEC information and a multipoint Label Distribution Protocol mLDP label of the local node, and the FEC information includes the address of the user-side root node (the method is completely the same as S402; reference may be made to S402, and details are not repeated any further).

S603. A network-side leaf node receives the mLDP mapping message from at least one downstream user-side leaf node (the method is completely the same as S403; reference may be made to S403, and details are not repeated any further).

S604. The network-side leaf node performs snooping on the mLDP mapping message to acquire, from the mLDP mapping message, the FEC information and the mLDP label of the user-side leaf node to which the mLDP mapping message belongs. The FEC includes the address of the user-side root node.

Specifically, in a scenario in which neither an N-PE (leaf) node nor an N-PE (root) node supports mLDP, after receiving an mLDP mapping message, the N-PE (leaf) is unable to directly obtain an mLDP label of a U-PE (leaf) node to which an mLDP mapping message belongs and FEC information from the mLDP mapping message. Therefore, it is necessary to perform snooping (Snooping) on the mLDP mapping message to obtain the mLDP label and FEC information from the message.

S605. The network-side leaf node acquires an address of a network-side root node according to the address of the user-side root node in the FEC information (the method is completely the same as S404; reference may be made to S404, and details are not repeated any further).

S606. The network-side leaf node sends a first received mLDP mapping message to the upstream network-side root node according to the address of the network-side root node.

Specifically, if FEC information in all mLDP mapping messages sent by at least one downstream U-PE (leaf) node is the same, message suppression processing is performed on these mLDP mapping messages, that is, the $1^{st}$ message among these messages is transparently transmitted to the upstream N-PE (root) node.

S607. The network-side leaf node generates a packet forwarding entry of the network-side root node according to an RSVP label of the local node and mLDP labels of all the user-side leaf nodes that send the mLDP mapping messages.

Exemplarily, the RSVP label of the local node may be set as an incoming label, and the mLDP labels of all the downstream U-PE (leaf) nodes that send the mLDP mapping messages may be set as outgoing labels, so as to generate a packet forwarding entry of the local node.

The RSVP label of the local node is allocated when the local node establishes an RSVP P2MP LSP to the N-PE (root) node. It should be noted that, sending the $1^{st}$ mLDP mapping message to the upstream N-PE (root) node and establishing the packet forwarding entry of the local node may be performed at the same time.

S608. The network-side root node receives the mLDP mapping message, which is sent by the user-side leaf node and forwarded by at least one downstream network-side leaf node. That is, after the user-side leaf node sends the mLDP mapping message to the network-side leaf node, the network-side leaf node transparently transmits the mLDP mapping message to the network-side root node.

S609. The network-side root node performs snooping on the received mLDP mapping message to acquire, from the mLDP mapping message, the FEC information and the mLDP label of the user-side leaf node to which the mLDP mapping message belongs (the method is completely the same as S604; reference may be made to S604, and details are not repeated any further).

S610. The network-side root node acquires the RSVP P2MP LSP according to network-side leaf nodes.

Specifically, because the network-side leaf nodes transparently transmit mLDP mapping messages, the network-side root node does not know who the network-side leaf nodes are. Therefore, when transparently transmitting the mLDP mapping messages, the network-side leaf nodes need to notify the network-side root node by using a protocol, to indicate that the network-side leaf nodes are network-side leaf nodes. This protocol may use a BGP (Border Gateway Protocol, Border Gateway Protocol)-based RSVP P2MP leaf discovery technology, or a distribution protocol may be used for implementation. The method for acquiring, by the network-side root node, the RSVP P2MP LSP according to the network-side leaf nodes after the network-side leaf nodes are discovered is completely the same as that of S408. Reference may be made to S408, and details are not repeated any further.

S611. The network-side root node allocates a label to the FEC information in the mLDP mapping messages, and sends the label of the FEC information to all the network-side leaf nodes on the RSVP P2MP LSP (the method is completely the same as S409; reference may be made to S409, and details are not repeated any further).

S612. The network-side root node sends the $1^{st}$ received mLDP mapping message to the upstream user-side root node according to the address of the user-side root node.

Specifically, if FEC information in all mLDP mapping messages sent by at least one downstream N-PE (leaf) node is the same, message suppression processing is performed on these mLDP mapping messages, that is, the $1^{st}$ message among these messages is transparently transmitted to the upstream U-PE (root) node.

S613. The network-side root node generates a packet forwarding entry of the network-side root node according to an RSVP label of the local node, mLDP labels of all the network-side leaf nodes that forward the mLDP mapping messages, and the label of the FEC information.

The N-PE (root) node associates the mLDP label in the $1^{st}$ mLDP mapping message received by the N-PE (root) node with the RSVP P2MP LSP and the label of the FEC information, and generates a packet forwarding entry of the N-PE (root) node, where the mLDP label in the $1^{st}$ mLDP mapping message received by the N-PE (root) node is set as an incoming label, and an RSVP label of a lower-level node of the N-PE (root) node on the RSVP P2MP LSP is set as an outgoing label, where the RSVP label of the N-PE (leaf) node is allocated when the N-PE (root) node establishes the RSVP P2MP LSP to the N-PE (leaf) node. It should be noted that, sending the first mLDP mapping message to the upstream U-PE (root) node and establishing the packet forwarding entry of the local node may be performed at the same time.

S614. The user-side root node receives the mLDP mapping message sent by the user-side leaf node, from at least one downstream network-side root node.

S615. The user-side root node generates a forwarding entry of the user-side root node according to the FEC information and the mLDP label of the user-side leaf node to which the mLDP mapping message belongs in the mLDP mapping message.

In this way, a whole packet sending path is established. In a case in which a network-side node (N-PE) does not support mLDP, mLDP over RSVP P2MP (mLDP P2MP over RSVP P2MP) multicast in a non-VPN scenario is implemented by using a Snooping function. That is, simple deployment is achieved by using mLDP, and bandwidth reservation and resource saving are implemented by using RSVP. In addition, message suppression processing is performed on mLDP mapping messages that include the same FEC information, and only the $1^{st}$ mLDP mapping message is forwarded to the upstream, which further saves bandwidth and reduces processing load of the node.

Figure 7:
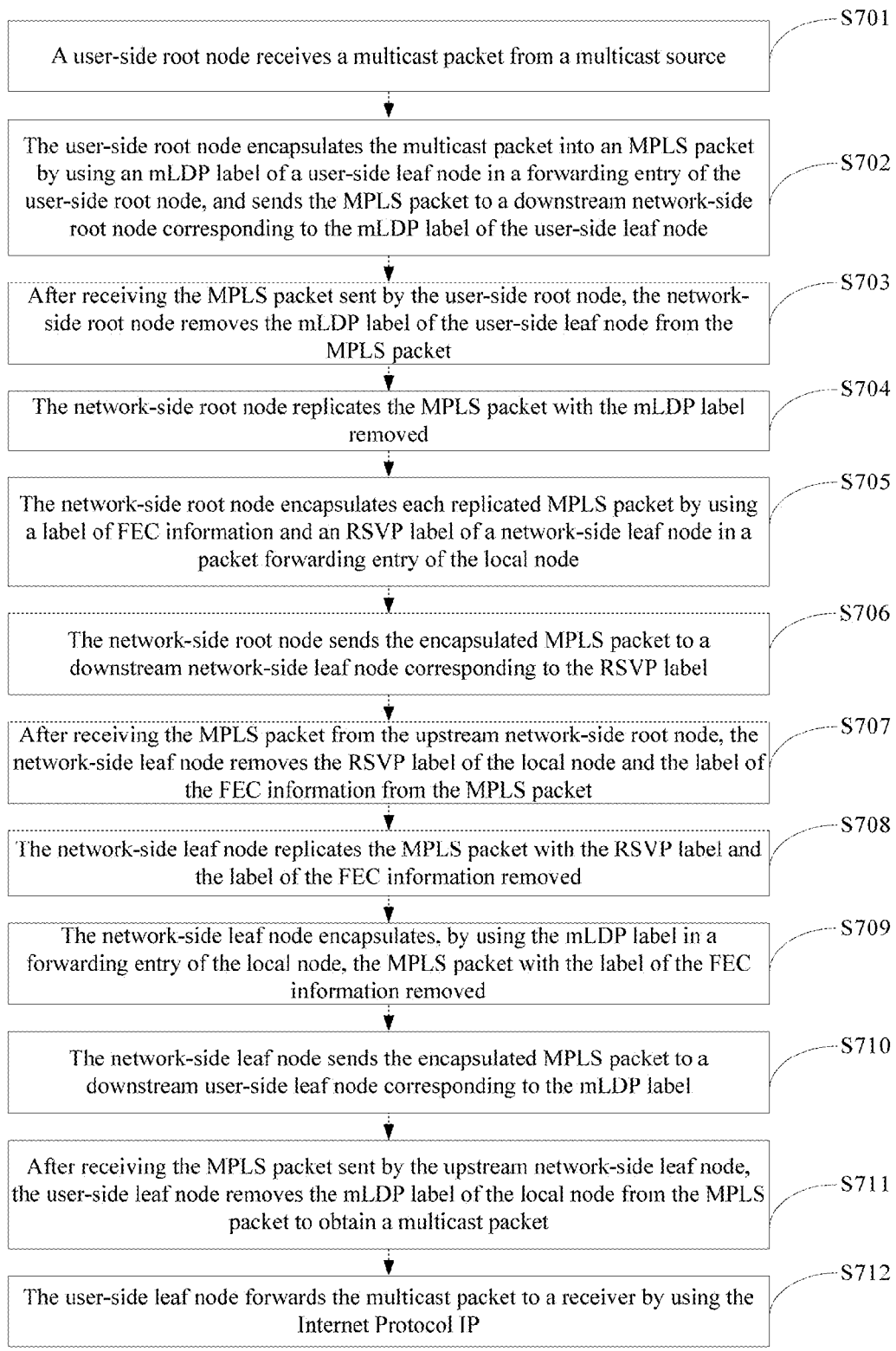
FIG. 7 is a fourth schematic flowchart of a method for implementing point-to-multipoint multicast according to another embodiment of the present invention.

In another aspect, at a data level, after the whole mLDP over RSVP P2MP multicast path is established, as shown in FIG. 7, the method further includes the following:

S701. The user-side root node receives a multicast packet from the multicast source.

S702. The user-side root node encapsulates the multicast packet into an MPLS packet by using the mLDP label of the user-side leaf node in the forwarding entry of the user-side root node, and sends the MPLS packet to the downstream network-side root node corresponding to the mLDP label of the user-side leaf node.

Specifically, because the N-PE (root) node does not support mLDP, the N-PE (root) node does not allocate an mLDP label to the N-PE (root) node itself, but transparently transmits, to the upstream user-side root node, the $1^{st}$ mLDP mapping message sent by the downstream user-side leaf node. Therefore, when encapsulating the multicast packet, the user-side root node encapsulates the multicast packet by using the mLDP label in the received mLDP mapping message.

S703. After receiving the MPLS packet sent by the user-side root node, the network-side root node removes the mLDP label of the user-side leaf node from the MPLS packet.

S704. The network-side root node replicates the MPLS packet with the mLDP label removed. The number of replicated packets is determined according to the number of outgoing labels in the packet forwarding entry of the network-side root node.

S705. The network-side root node encapsulates each replicated MPLS packet by using the label of the FEC information and the RSVP label of the network-side leaf node in the packet forwarding entry of the network-side root node (the method is completely the same as S504; reference may be made to S504, and details are not repeated any further).

S706. The network-side root node sends the encapsulated MPLS packet to the downstream network-side leaf node corresponding to the RSVP label.

S707. After receiving the MPLS packet from the upstream network-side root node, the network-side leaf node removes the RSVP label of the local node and the label of the FEC information from the MPLS packet.

S708. The network-side leaf node replicates the MPLS packet with the RSVP label and the label of the FEC information removed (the method is completely the same as S507; reference may be made to S507, and details are not repeated any further).

S709. The network-side leaf node encapsulates, by using the mLDP label in the forwarding entry of the node, the MPLS packet with the label of the FEC information removed.

S710. The network-side leaf node sends the encapsulated MPLS packet to the downstream user-side leaf node corresponding to the mLDP label.

S711. After receiving the MPLS packet sent by the upstream network-side leaf node, the user-side leaf node removes the mLDP label of the user-side leaf node from the MPLS packet to obtain a multicast packet.

S712. The user-side leaf node forwards the multicast packet to a receiver by using the Internet Protocol IP.

This embodiment further provides a failover method for a part of links of an mLDP P2MP LSP. A specific implementation manner may be as follows:

The mLDP protocol is used for processing between an intermediate node P (leaf) node and a PE (root) node. The PE (root) node and the P (leaf) node may be designated by manual configuration, or may be acquired by calculation according to network-wide routing information, mLDP FEC information, and information about which nodes in the network support RSVP P2MP.

After the PE (root) node and the P (leaf) node that supports RSVP P2MP are selected, a backup RSVP P2MP LSP is established, and an inner label, namely, a label of FEC information, is allocated. For a specific implementation manner, reference may be made to S409, and details are not repeated any further.

Then when establishing an mLDP P2MP LSP, the PE (root) node needs to associate the label of the FEC information with the mLDP P2MP LSP and a backup RSVP P2MP LSP.

Figure 8:
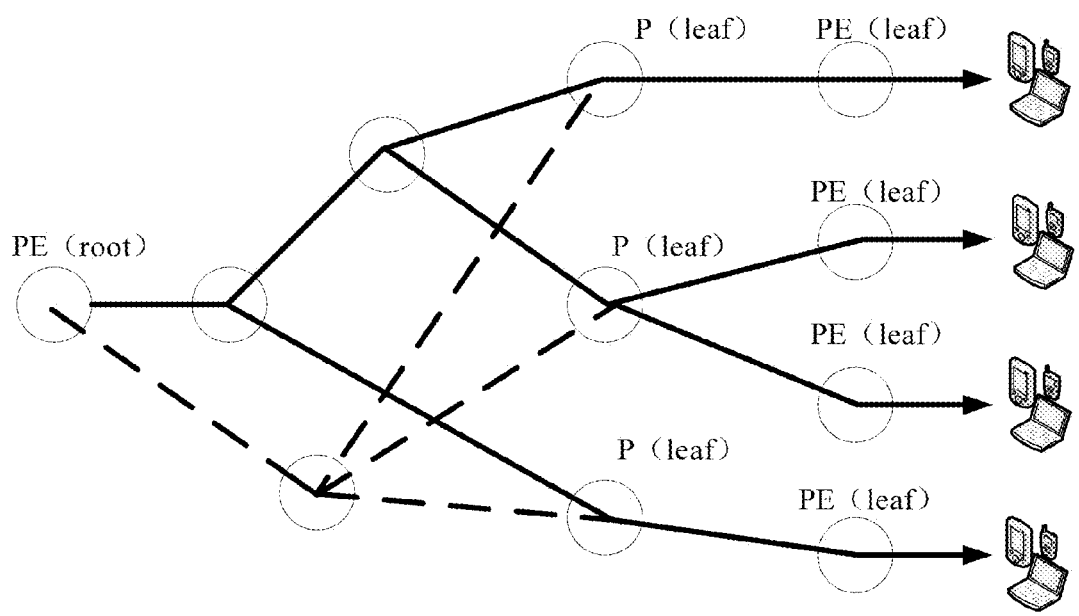
FIG. 8 is a schematic diagram of a protection effect of a point-to-multipoint multicast link according to another embodiment.

FIG. 8 shows an mLDP P2MP LSP, where a dotted line represents a backup RSVP P2MP LSP. When a failure occurs, a packet may be switched from the mLDP P2MP LSP to the backup RSVP P2MP LSP. In this way, a process of re-convergence of a routing protocol is avoided, a switching speed is high, and service interruption can be prevented.

The embodiment of the present invention provides a method for implementing point-to-multipoint multicast. First, a network-side leaf node acquires an mLDP label of a downstream user-side leaf node and FEC information by performing snooping on an mLDP mapping message of the downstream user-side leaf node, then transparently transmits the $1^{st}$ received mLDP mapping message to an upstream network-side root node, and generates a forwarding entry; then the network-side root node searches for or establishes an RSVP P2MP LSP, allocates a label value to the received FEC information, and associates a forwarding entry of each network-side leaf node with the label value of the FEC information; meanwhile, the network-side root node transparently transmits the $1^{st}$ received mLDP mapping message to an upstream user-side leaf node, and associates the mLDP label in the mLDP mapping message with the RSVP P2MP LSP and the label of the FEC information. In this way, an mLDP over RSVP point-to-multipoint multicast path is established, which is applicable to P2MP multicast in a non-VPN scenario. Because the node can acquire FEC information and an mLDP label of a downstream node from an mLDP mapping message by snooping, it is not necessary for each node to completely support mLDP, so that deployment can also be implemented when a node does not support mLDP. Further, during packet forwarding, excessive packet replication can be avoided, and bandwidth resources can be saved. In addition, message suppression processing is performed on mLDP mapping messages that include the same FEC information, which further saves bandwidth and reduces processing load of the node.

Figure 9:
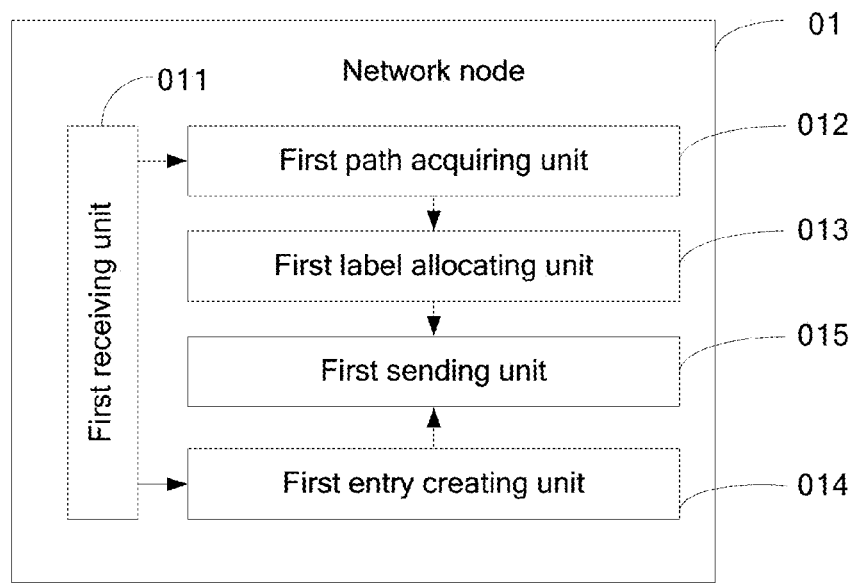
FIG. 9 is a first schematic structural diagram of a network node according to an embodiment of the present invention.

The present invention provides a network node 01. As shown in FIG. 9, the network node 01 includes:

a first receiving unit 011, configured to receive an mLDP mapping message from at least one downstream node, where each mLDP mapping message includes forwarding equivalence class FEC information and an mLDP label of a node to which the mLDP mapping message belongs, and send each mLDP mapping message to a first label allocating unit 013 and a first entry creating unit 014;

a first path acquiring unit 012, configured to acquire an RSVP P2MP LSP according to the downstream nodes that send the mLDP mapping messages, and send information about the RSVP P2MP LSP to the first label allocating unit 013 and the first entry creating unit 014;

the first label allocating unit 013, configured to receive each mLDP mapping message from the first receiving unit 011, receive the information about the RSVP P2MP LSP from the first path acquiring unit 012, allocate a label to the FEC information, and send the label of the FEC information to all the nodes that are on the RSVP P2MP LSP and send the mLDP mapping messages;

the first entry creating unit 014, configured to receive each mLDP mapping message from the first receiving unit 011, receive the information about the RSVP P2MP LSP from the first path acquiring unit 012, and generate a packet forwarding entry of the local node according to an mLDP label of the local node, the RSVP P2MP LSP, and the label of the FEC information; and a first sending unit 015, configured to send a new mLDP mapping message to an upstream node, where the new mLDP mapping message includes the FEC information and the mLDP label of the local node, and the FEC information includes an address of a user-side root node.

Further, the first path acquiring unit 012 may be specifically configured to:

search for an existing RSVP P2MP LSP according to the downstream nodes that send the mLDP mapping messages; or establish the RSVP P2MP LSP according to the downstream nodes that send the mLDP mapping messages, where the RSVP P2MP LSP includes all the downstream nodes that send the mLDP mapping messages.

Still further, the first label allocating unit 013 may be specifically configured to:

send a distribution message that includes the FEC information and the label of the FEC information to an intermediate node, so that the intermediate node sends, after replicating the distribution message, the distribution message to all the nodes that are on the RSVP P2MP LSP and send the mLDP mapping messages; or after connections are established to all the nodes that are on the RSVP P2MP LSP and send the mLDP mapping messages, send a distribution message directly to all the nodes that are on the RSVP P2MP LSP and send the mLDP mapping messages, so that all the nodes that send the mLDP mapping messages use the label of the FEC information as an incoming label of packet forwarding entries of the nodes.

Still further, the first entry creating unit 014 is specifically configured to:

associate the mLDP label of the local node with the RSVP P2MP LSP and the label of the FEC information, and generate the packet forwarding entry of the local node, where the mLDP label of the local node is set as an incoming label, and an RSVP label of a downstream node that sends the mLDP mapping message is set as an outgoing label, where the RSVP label of the downstream node that sends the mLDP mapping message is allocated when the RSVP P2MP LSP is established.

Still further, the first receiving unit 011 is configured to receive a multi-protocol label switching packet from an upstream node, where the multi-protocol label switching packet is encapsulated by the user-side root node by using an mLDP label of the local node.

Figure 10:
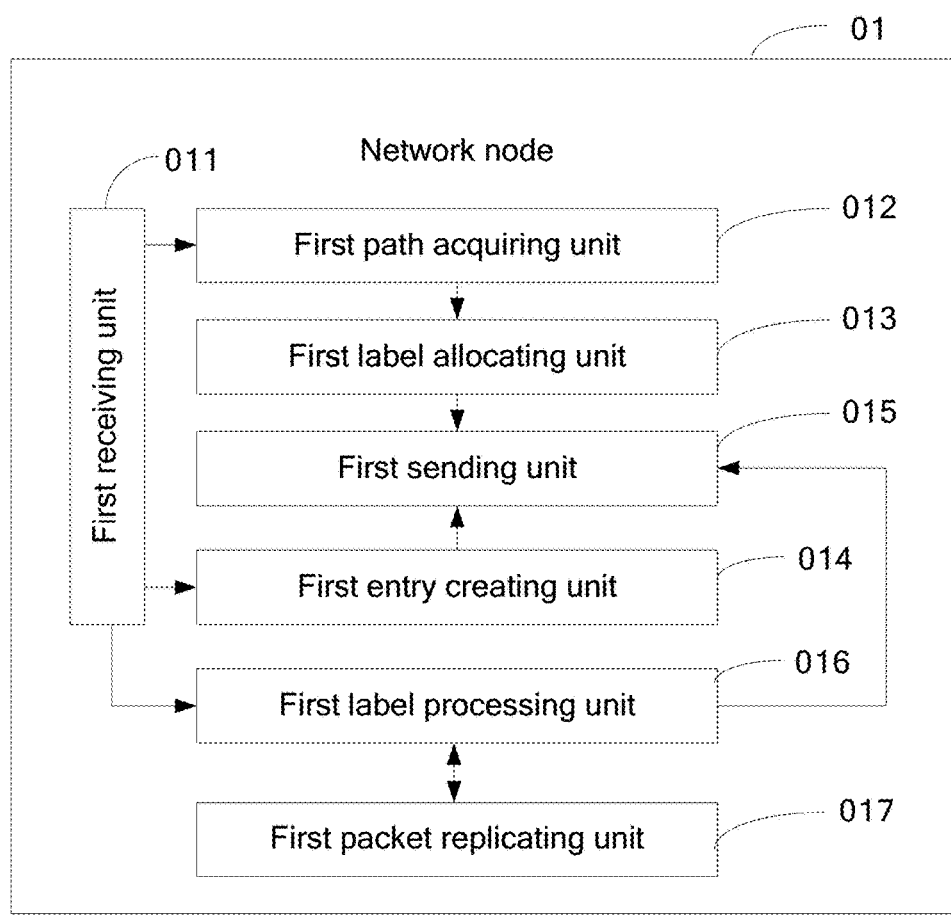
FIG. 10 is a second schematic structural diagram of a network node according to an embodiment of the present invention.

As shown in FIG. 10, the network node 01 may further include:

a first label processing unit 016, configured to remove the mLDP label of the local node from the multi-protocol label switching packet, and send the multi-protocol label switching packet with the mLDP label removed to a first packet replicating unit 017; and the first packet replicating unit 017, configured to receive, from the first label processing unit 016, the multi-protocol label switching packet with the mLDP label removed, replicate the multi-protocol label switching packet with the mLDP label removed, where the number of replicated multi-protocol label switching packets is equal to the number of outgoing labels in the packet forwarding entry of the local node, and send the replicated multi-protocol label switching packets to the first label processing unit 016, where:

the first label processing unit 016 is further configured to receive the replicated multi-protocol label switching packets from the first packet replicating unit 017, encapsulate the replicated multi-protocol label switching packet by using the label of the FEC information and an RSVP label of a downstream node that sends an mLDP mapping message, where the label of the FEC information is used as an inner label, and the RSVP label of the downstream node that sends the mLDP mapping message is used as an outer label, and then send, by using the first sending unit 015, the multi-protocol label switching packet to the downstream node corresponding to the RSVP label of the downstream node that sends the mLDP mapping message.

The embodiment of the present invention provides a network node. After receiving an mLDP mapping message sent by a network-side leaf node, the network node acquires an RSVP P2MP LSP, allocates a label value to received FEC information, and associates a forwarding entry of each network-side leaf node with the label value of the FEC information; meanwhile, the network-side root node sends an mLDP label of the network-side root node and the FEC information to an upstream user-side leaf node by using an mLDP mapping message, and associates the mLDP label of the network-side root node with the RSVP P2MP LSP and the label of the FEC information. In this way, an mLDP over RSVP point-to-multipoint multicast path is established, which is applicable to P2MP multicast in a non-VPN scenario. Further, during packet forwarding, excessive packet replication is avoided, and bandwidth resources are saved.

Figure 11:
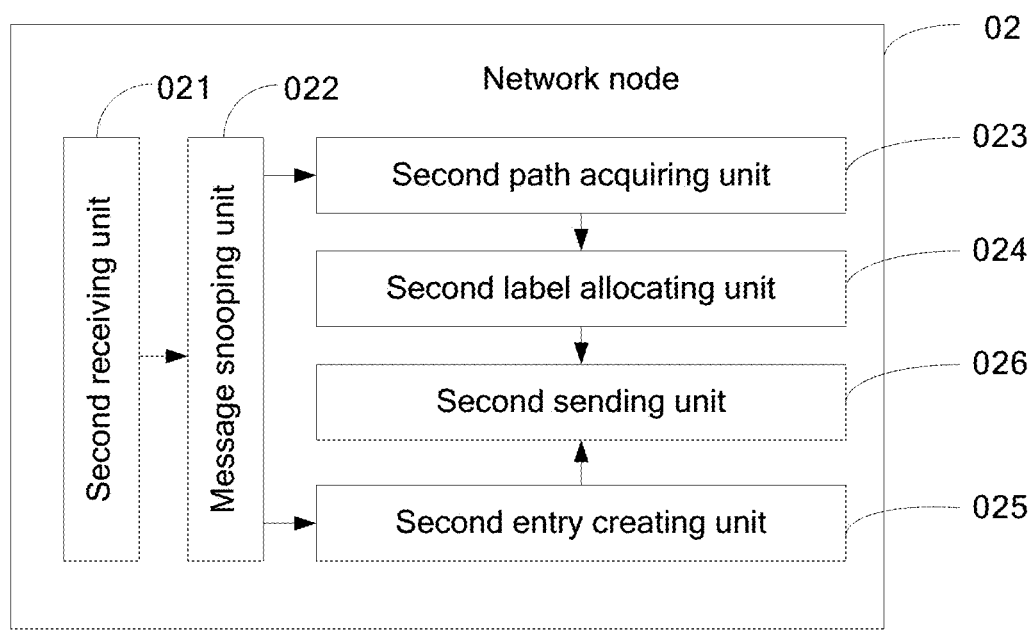
FIG. 11 is a first schematic structural diagram of another network node according to an embodiment of the present invention.

The present invention provides a network node 02. As shown in FIG. 11, the network node 02 includes:

a second receiving unit 021, configured to receive an mLDP mapping message, which is sent by a user-side leaf node and forwarded by at least one downstream node, and send the received mLDP mapping message to a message snooping unit 022;

the message snooping unit 022, configured to perform snooping on the received mLDP mapping message to acquire, from the mLDP mapping message, FEC information and an mLDP label of the user-side leaf node to which the mLDP mapping message belongs, and send the message undergoing the snooping to a second label allocating unit 024 and a second entry creating unit 025;

a second path acquiring unit 023, configured to acquire a Resource Reservation Protocol point-to-multipoint path RSVP P2MP LSP;

the second label allocating unit 024, configured to receive, from the second receiving unit 021, the message undergoing the snooping, allocate a label to the FEC information, and send the label of the FEC information to all the nodes that are on the RSVP P2MP LSP and forward the mLDP mapping messages;

the second entry creating unit 025, configured to receive, from the second receiving unit 021, the message undergoing the snooping, and according to an mLDP label in the $1^{st}$ mLDP mapping message received by the local node, the RSVP P2MP LSP, and the label of the FEC information, generate a packet forwarding entry of the local node; and a second sending unit 026, configured to forward the $1^{st}$ mLDP mapping message among received mLDP mapping messages that belong to the same FEC information, to an upstream node.

Further, the second entry creating unit 025 may be specifically configured to:

associate the mLDP label in the $1^{st}$ mLDP mapping message received by the local node with the RSVP P2MP LSP and the label of the FEC information, and generate the packet forwarding entry of the network-side root node, where the mLDP label in the $1^{st}$ mLDP mapping message received by the local node is set as an incoming label, and an RSVP label of a downstream node that forwards the mLDP mapping message is set as an outgoing label, where the RSVP label of the lower-level node of the local node is allocated when the RSVP P2MP LSP is established.

Still further, the second receiving unit 021 is further configured to receive a multi-protocol label switching packet from an upstream node, where the multi-protocol label switching packet is encapsulated by a user-side root node by using the mLDP label of the user-side leaf node.

Figure 12:
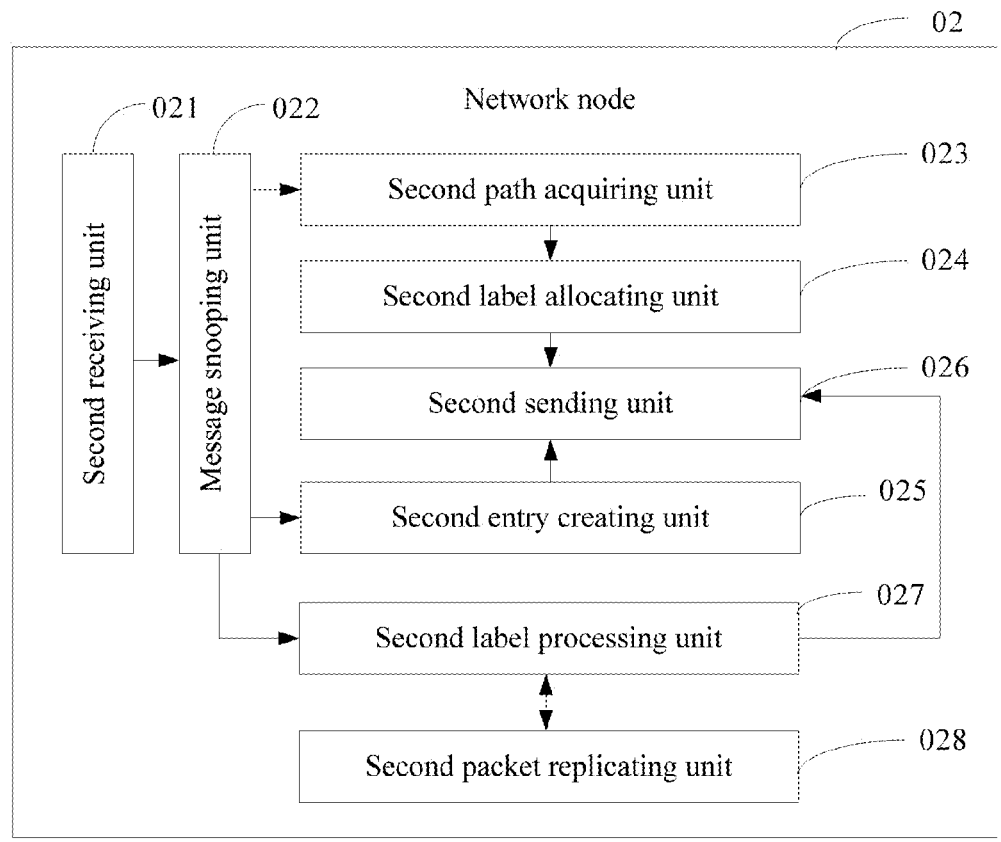
FIG. 12 is a second schematic structural diagram of another network node according to an embodiment of the present invention.

As shown in FIG. 12, the network node 02 may further include:

a second label processing unit 027, configured to remove the mLDP label of the user-side leaf node from the multi-protocol label switching packet, and send the multi-protocol label switching packet with the mLDP label removed, to a second packet replicating unit 028; and the second packet replicating unit 028, configured to receive, from the second label processing unit 027, the multi-protocol label switching packet with the mLDP label removed, and replicate the multi-protocol label switching packet with the mLDP label removed, where the number of replicated multi-protocol label switching packets is equal to the number of outgoing labels in the packet forwarding entry of the network-side root node.

The second label processing unit 027 is further configured to receive the replicated multi-protocol label switching packets from the second packet replicating unit 028, encapsulate the replicated multi-protocol label switching packets by using the label of the FEC information and the RSVP label of the downstream node that forwards the mLDP mapping message, where the label of the FEC information is used as an inner label, and the RSVP label of the downstream node that forwards the mLDP mapping message is used as an outer label, and send, by using the second sending unit 026, the multi-protocol label switching packet to the downstream node corresponding to the RSVP label of the downstream node that forwards the mLDP mapping message.

The embodiment of the present invention provides a network node. First, the network node acquires an mLDP label of a downstream user-side leaf node and FEC information by performing snooping on an mLDP mapping message of a downstream network-side leaf node; then the network-side root node searches for or establishes an RSVP P2MP LSP, allocates a label value to the received FEC information, and associates a forwarding entry of each network-side leaf node with the label value of the FEC information; meanwhile, the network-side root node transparently transmits the $1^{st}$ received mLDP mapping message to an upstream node, and associates an mLDP label in the mLDP mapping message with the RSVP P2MP LSP and the label of the FEC information. In this way, an mLDP over RSVP point-to-multipoint multicast path is established, which is applicable to P2MP multicast in a non-VPN scenario. Because the node can acquire FEC information and an mLDP label of a downstream node from an mLDP mapping message by snooping, it is not necessary for each node to completely support mLDP, so that deployment can also be implemented when a node does not support mLDP. Further, during packet forwarding, excessive packet replication can be avoided, and bandwidth resources can be saved. In addition, message suppression processing is performed on mLDP mapping messages that include the same FEC information, which further saves bandwidth and reduces processing load of the node.

Figure 13:
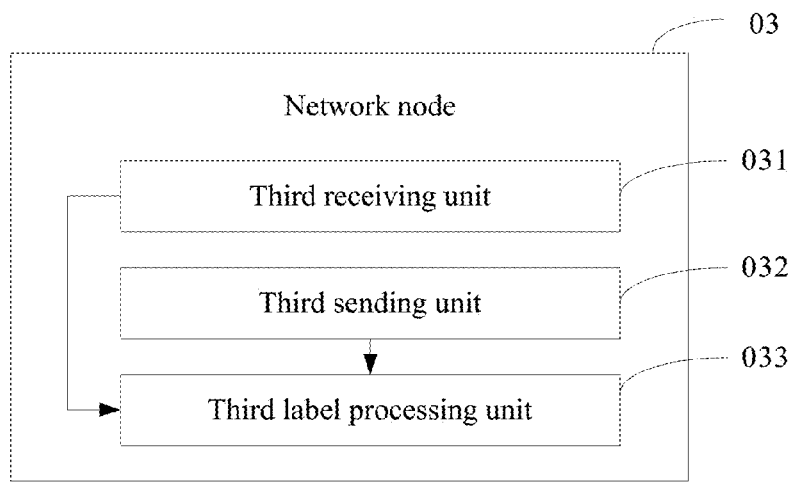
FIG. 13 is a first schematic structural diagram of still another network node according to an embodiment of the present invention.

The present invention provides a network node 03. As shown in FIG. 13, the network node 03 includes:

a third receiving unit 031, configured to receive a distribution message that includes FEC information and a label of the FEC information from an upstream node, and send the distribution message to a third label processing unit 033;

a third sending unit 032, configured to send a response message to the upstream node that sends the distribution message; and the third label processing unit 033, configured to receive the distribution message from the third receiving unit 031, and use the label of the FEC information as an incoming label of a packet forwarding entry of the local node.

Further, the third receiving unit 031 may be specifically configured to:

receive, from an intermediate node, the distribution message sent by the network-side root node; or after a connection is established to the network-side root node on an RSVP P2MP LSP, receive the distribution message directly from the network-side root node.

Still further, the third receiving unit 031 is further configured to receive a multi-protocol label switching packet from the upstream network-side root node; and the third label processing unit 033 is further configured to remove an RSVP label of the local node and the label of the FEC information from the multi-protocol label switching packet, where the RSVP label of the local node is allocated when the local node establishes the RSVP P2MP LSP to the network-side root node.

Figure 14:
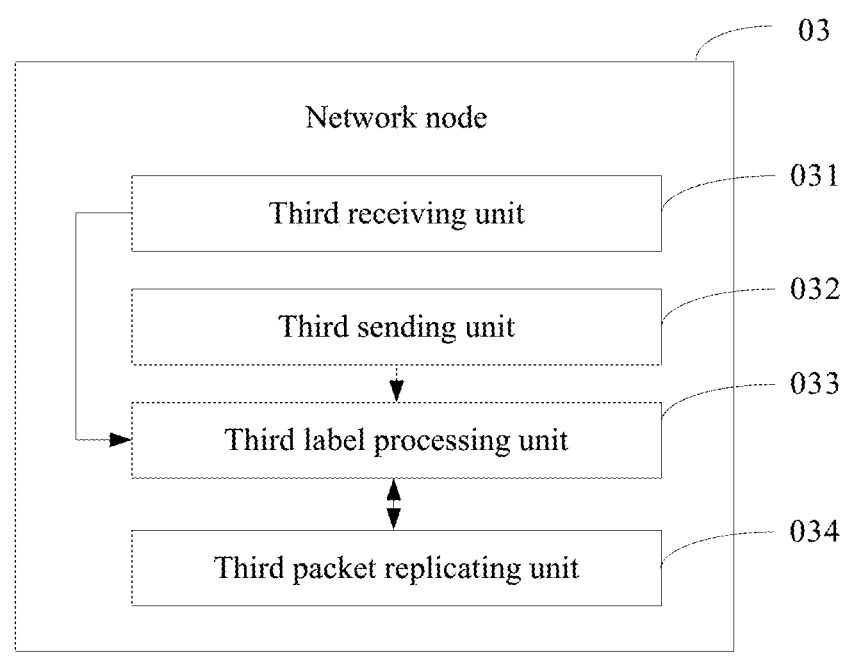
FIG. 14 is a second schematic structural diagram of still another network node according to an embodiment of the present invention.

Still further, as shown in FIG. 14, the network node 03 further includes:

a third packet replicating unit 034, configured to replicate the multi-protocol label switching packet with the RSVP label and the label of the FEC information removed, where the number of replicated multi-protocol label switching packets is determined according to the number of mLDP labels of downstream nodes corresponding to the label of the FEC information, and send the replicated multi-protocol label switching packets to the third label processing unit 033.

The third label processing unit 033 is further configured to receive the replicated multi-protocol label switching packets from the third packet replicating unit 034, encapsulate the replicated multi-protocol label switching packet by using an mLDP label in an mLDP mapping message sent by a downstream node, and send, by using the third sending unit 032, the multi-protocol label switching packet to the downstream node corresponding to the mLDP label of the downstream node.

The embodiment of the present invention provides a network node, which is configured to receive a distribution message sent by an upstream network-side root node, to acquire a label of FEC information, so that an mLDP label of the local node is associated with an RSVP P2MP LSP and the label of the FEC information. In this way, an mLDP over RSVP point-to-multipoint multicast path is established, which is applicable to P2MP multicast in a non-VPN scenario. Because the node can acquire FEC information and an mLDP label of a downstream node from an mLDP mapping message by snooping, it is not necessary for each node to completely support mLDP, so that deployment can also be implemented when a node does not support mLDP. Further, during packet forwarding, excessive packet replication can be avoided, and bandwidth resources can be saved.

Figure 15:
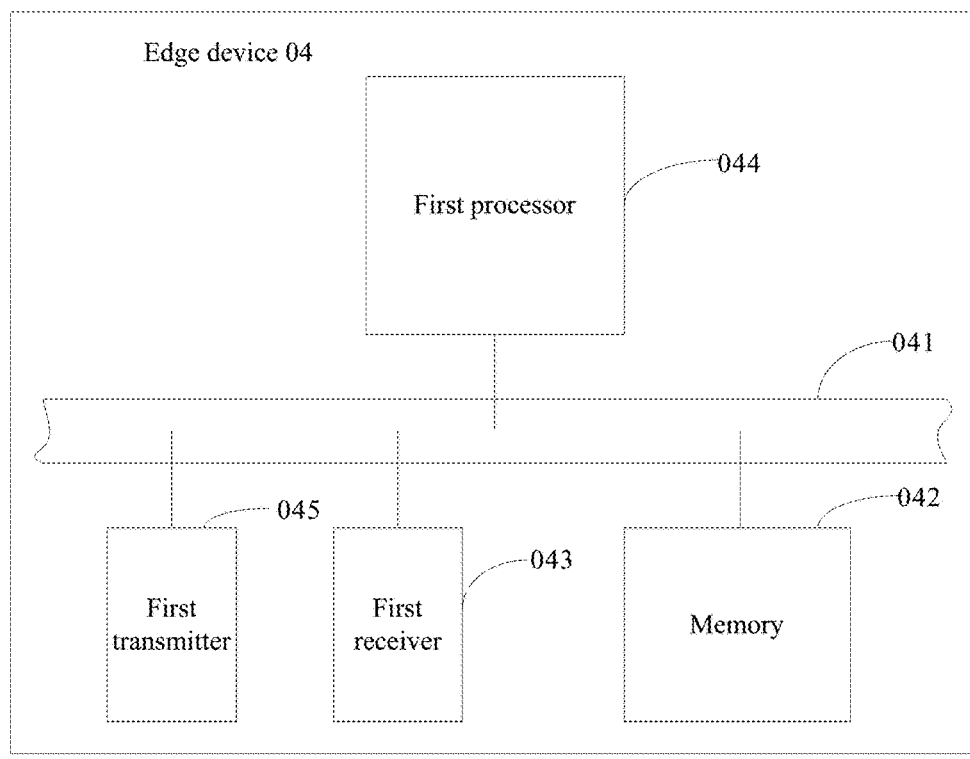
FIG. 15 is a schematic structural diagram of an edge device according to an embodiment of the present invention.

An embodiment of the present invention further provides an edge device 04, which includes a bus 041 and a memory 042, and as shown in FIG. 15, further includes:

a first receiver 043, configured to receive an mLDP mapping message from at least one downstream node, where each mLDP mapping message includes forwarding equivalence class FEC information and an mLDP label of a node to which the mLDP mapping message belongs;

a first processor 044, configured to acquire a Resource Reservation Protocol point-to-multipoint path RSVP P2MP LSP according to the downstream nodes that send the mLDP mapping messages;

the first processor 044, further configured to allocate a label to the FEC information, and send the label of the FEC information to all the nodes that send the mLDP mapping message and are on the RSVP P2MP LSP; where:

the first processor 044 is further configured to generate a packet forwarding entry of the local node according to an mLDP label of the local node, the RSVP P2MP LSP, and the label of the FEC information; and a first transmitter 045, configured to send a new mLDP mapping message to an upstream node, where the new mLDP mapping message includes the FEC information and the mLDP label of the local node, and the FEC information includes an address of a user-side root node.

Further, the first processor 044 may be specifically configured to:

search for an existing RSVP P2MP LSP according to the downstream nodes that send the mLDP mapping messages; or establish the RSVP P2MP LSP according to the downstream nodes that send the mLDP mapping messages;

where the RSVP P2MP LSP includes all the downstream nodes that send the mLDP mapping messages.

Still further, the first processor 044 may be specifically configured to:

send a distribution message that includes the FEC information and the label of the FEC information to an intermediate node, so that the intermediate node sends, after replicating the distribution message, the distribution message to all the nodes that are on the RSVP P2MP LSP and send the mLDP mapping messages; or after connections are established to all the nodes that are on the RSVP P2MP LSP and send the mLDP mapping messages, send a distribution message directly to all the nodes that are on the RSVP P2MP LSP and send the mLDP mapping messages, so that all the nodes that send the mLDP mapping messages use the label of the FEC information as an incoming label of packet forwarding entries of the nodes.

Still further, the first processor 044 may be specifically configured to:

associate the mLDP label of the local node with the RSVP P2MP LSP and the label of the FEC information, and generate the packet forwarding entry of the local node, where the mLDP label of the local node is set as an incoming label, and an RSVP label of a downstream node that sends the mLDP mapping message is set as an outgoing label, where the RSVP label of the downstream node that sends the mLDP mapping message is allocated when the RSVP P2MP LSP is established.

Still further, the first receiver 043 may be configured to receive a multi-protocol label switching packet from an upstream node, where the multi-protocol label switching packet is encapsulated by the user-side root node by using an mLDP label of the local node.

The first processor 044 may be further configured to:

remove the mLDP label of the local node from the multi-protocol label switching packet;

replicate the multi-protocol label switching packet with the mLDP label removed, where the number of replicated multi-protocol label switching packets is equal to the number of outgoing labels in the packet forwarding entry of the local node; and encapsulate the replicated multi-protocol label switching packet by using the label of the FEC information and an RSVP label of a downstream node that sends an mLDP mapping message, where the label of the FEC information is used as an inner label, and the RSVP label of the downstream node that sends the mLDP mapping message is used as an outer label, and send, by using the first transmitter 045, the multi-protocol label switching packet to the downstream node corresponding to the RSVP label of the downstream node that sends the mLDP mapping message.

The embodiment of the present invention provides an edge device. After receiving an mLDP mapping message sent by a network-side leaf node, the edge device acquires an RSVP P2MP LSP, allocates a label value to received FEC information, and associates a forwarding entry of each network-side leaf node with the label value of the FEC information; meanwhile, the network-side root node sends an mLDP label of the network-side root node and the FEC information to an upstream user-side leaf node by using an mLDP mapping message, and associates the mLDP label of the network-side root node with the RSVP P2MP LSP and the label of the FEC information. In this way, an mLDP over RSVP point-to-multipoint multicast path is established, which is applicable to P2MP multicast in a non-VPN scenario. Further, during packet forwarding, excessive packet replication can be avoided, and bandwidth resources can be saved.

Figure 16:
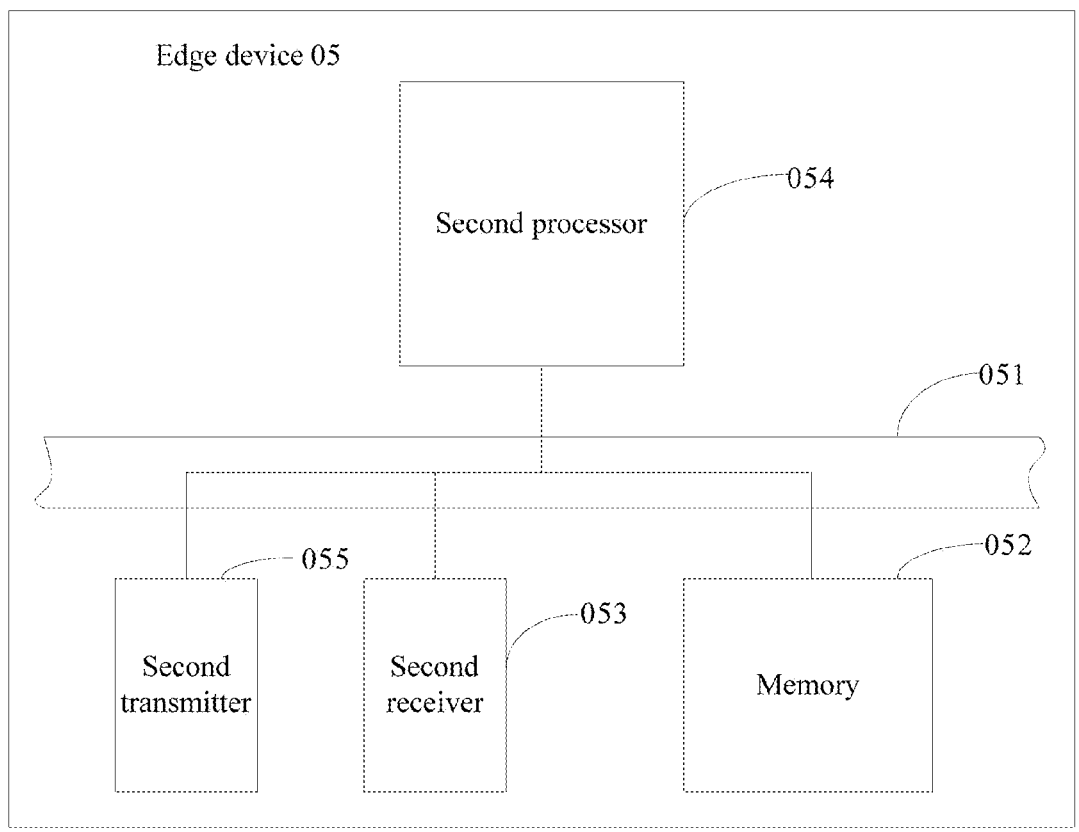
FIG. 16 is a schematic structural diagram of another edge device according to an embodiment of the present invention.

An embodiment of the present invention further provides an edge device 05, which includes a bus 051 and a memory 052, and as shown in FIG. 16, further includes:

a second receiver 053, configured to receive an mLDP mapping message, which is sent by a user-side leaf node and forwarded by at least one downstream node;

a second processor 054, configured to perform snooping on the received mLDP mapping message to acquire, from the mLDP mapping message, FEC information and an mLDP label of the user-side leaf node to which the mLDP mapping message belongs; where the second processor 054 is further configured to acquire a Resource Reservation Protocol point-to-multipoint path RSVP P2MP LSP;

the second processor 054 is further configured to allocate a label to the FEC information, and send the label of the FEC information to all the nodes that forward the mLDP mapping message and are on the RSVP P2MP LSP;

the second processor 054 is further configured to generate a packet forwarding entry of the local node according to an mLDP label in the 1$^{st}$ mLDP mapping message received by the local node, the RSVP P2MP LSP, and the label of the FEC information; and a second transmitter 055, configured to forward the 1$^{st}$ mLDP mapping message among received mLDP mapping messages that belong to the same FEC information, to an upstream node.

Further, the second processor 054 may be specifically configured to:

associate the mLDP label in the 1$^{st}$ mLDP mapping message received by the local node with the RSVP P2MP LSP and the label of the FEC information, and generate the packet forwarding entry of the network-side root node, where the mLDP label in the 1$^{st}$ mLDP mapping message received by the local node is set as an incoming label, and an RSVP label of a downstream node that forwards the mLDP mapping message is set as an outgoing label, where the RSVP label of the downstream node that forwards the mLDP mapping message is allocated when the RSVP P2MP LSP is established.

Still further, the second receiver 053 is configured to receive a multi-protocol label switching packet from an upstream node, where the multi-protocol label switching packet is encapsulated by a user-side root node by using the mLDP label of the user-side leaf node.

The second processor 054 may be further configured to:

remove the mLDP label of the user-side leaf node from the multi-protocol label switching packet;

replicate the multi-protocol label switching packet with the mLDP label removed, where the number of replicated multi-protocol label switching packets is equal to the number of outgoing labels in the packet forwarding entry of the network-side root node; and encapsulate the replicated multi-protocol label switching packet by using the label of the FEC information and the RSVP label of the downstream node that forwards the mLDP mapping message, where the label of the FEC information is used as an inner label, and the RSVP label of the downstream node that forwards the mLDP mapping message is used as an outer label, and send, by using the second transmitter 055, the multi-protocol label switching packet to the downstream node corresponding to the RSVP label of the downstream node that forwards the mLDP mapping message.

The embodiment of the present invention provides an edge device. First, the edge device acquires an mLDP label of a downstream user-side leaf node and FEC information by performing snooping on an mLDP mapping message of a downstream network-side leaf node; then the network-side root node searches for or establishes an RSVP P2MP LSP, allocates a label value to the received FEC information, and associates a forwarding entry of each network-side leaf node with the label value of the FEC information; meanwhile, the network-side root node transparently transmits the 1$^{st}$ received mLDP mapping message to an upstream node, and associates an mLDP label in the mLDP mapping message with the RSVP P2MP LSP and the label of the FEC information. In this way, an mLDP over RSVP point-to-multipoint multicast path is established, which is applicable to P2MP multicast in a non-VPN scenario. Because the node can acquire FEC information and an mLDP label of a downstream node from an mLDP mapping message by snooping, it is not necessary for each node to completely support mLDP, so that deployment can also be implemented when a node does not support mLDP. Further, during packet forwarding, excessive packet replication can be avoided, and bandwidth resources can be saved. In addition, message suppression processing is performed on mLDP mapping messages that include the same FEC information, which further saves bandwidth and reduces processing load of the node.

Figure 17:
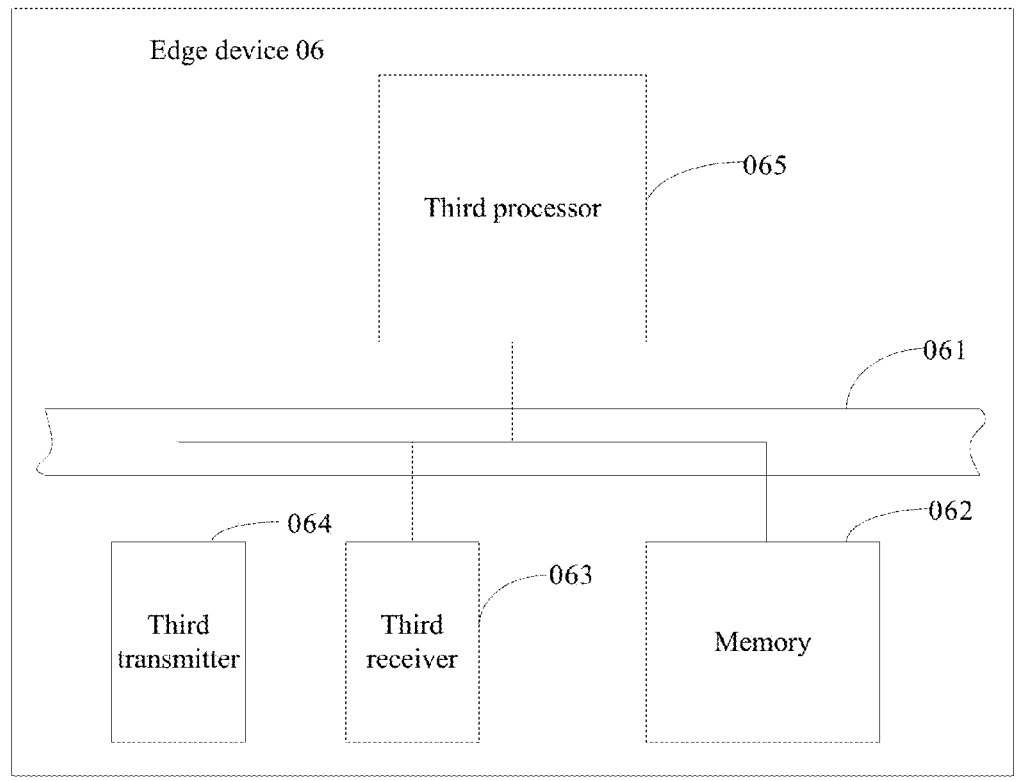
FIG. 17 is a schematic structural diagram of still another edge device according to an embodiment of the present invention.

An embodiment of the present invention further provides an edge device 06, which includes a bus 061 and a memory 062, and as shown in FIG. 17, further includes:

a third receiver 063, configured to receive a distribution message that includes FEC information and a label of the FEC information from an upstream node;

a third transmitter 064, configured to send a response message to the upstream node that sends the distribution message; and a third processor 065, configured to use the label of the FEC information as an incoming label of a packet forwarding entry of the local node.

Further, the third transmitter 064 may be specifically configured to:

receive, from an intermediate node, the distribution message sent by the network-side root node; or after a connection is established to the network-side root node on an RSVP P2MP LSP, receive the distribution message directly from the network-side root node.

Still further, the third receiver 063 receives a multi-protocol label switching packet from the upstream network-side root node; and the third processor 065 may be further configured to:

remove an RSVP label of the local node and the label of the FEC information from the multi-protocol label switching packet, where the RSVP label of the local node is allocated when the RSVP P2MP LSP is established;

replicate the multi-protocol label switching packet with the RSVP label and the label of the FEC information removed, where the number of replicated multi-protocol label switching packets is determined according to the number of mLDP labels of downstream nodes corresponding to the label of the FEC information; and encapsulate the replicated multi-protocol label switching packet by using an mLDP label in an mLDP mapping message sent by a downstream node, and send the multi-protocol label switching packet to the downstream node corresponding to the mLDP label of the downstream node.

The embodiment of the present invention provides an edge device, which is configured to receive a distribution message sent by an upstream network-side root node, to acquire a label of FEC information, so that an mLDP label of the local node is associated with an RSVP P2MP LSP and the label of the FEC information. In this way, an mLDP over RSVP point-to-multipoint multicast path is established, which is applicable to P2MP multicast in a non-VPN scenario. Because the node can acquire FEC information and an mLDP label of a downstream node from an mLDP mapping message by snooping, it is not necessary for each node to completely support mLDP, so that deployment can also be implemented when a node does not support mLDP. Further, during packet forwarding, excessive packet replication can be avoided, and bandwidth resources can be saved.

Figure 18:
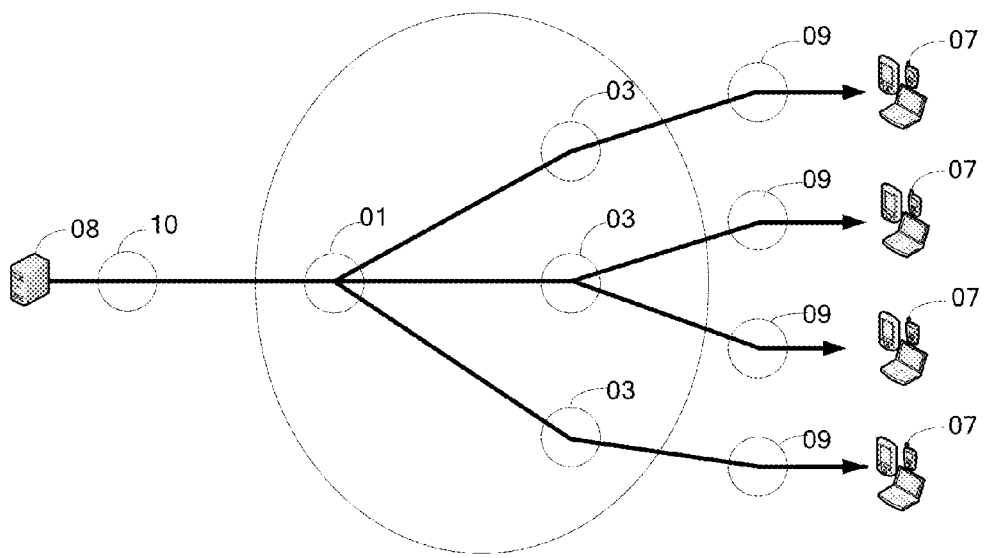
FIG. 18 is a schematic structural diagram of a communications system according to an embodiment of the present invention.

An embodiment of the present invention further provides a communications system 1, which includes receivers 07, a multicast source 08, user-side leaf nodes 09, and a user-side root node 10, and as shown in FIG. 18, further includes:

a network node 01 and network nodes 03 provided in the foregoing embodiments.

The embodiment of the present invention provides a communications system. A network-side leaf node acquires an mLDP label of a downstream user-side leaf node and FEC information from an mLDP mapping message of the downstream user-side leaf node, then sends an mLDP label of the network-side leaf node and the FEC information to an upstream network-side root node by using an mLDP mapping message, and generates a forwarding entry; then the network-side root node acquires an RSVP P2MP LSP, allocates a label value to the received FEC information, and associates a forwarding entry of each network-side leaf node with the label value of the FEC information; meanwhile, the network-side root node sends an mLDP label of the network-side root node and the FEC information to an upstream user-side leaf node by using an mLDP mapping message, and associates the mLDP label of the network-side root node with the RSVP P2MP LSP and the label of the FEC information. In this way, an mLDP over RSVP point-to-multipoint multicast path is established, which is applicable to P2MP multicast in a non-VPN scenario. Further, during packet forwarding, excessive packet replication is avoided, and bandwidth resources are saved.

Figure 19:
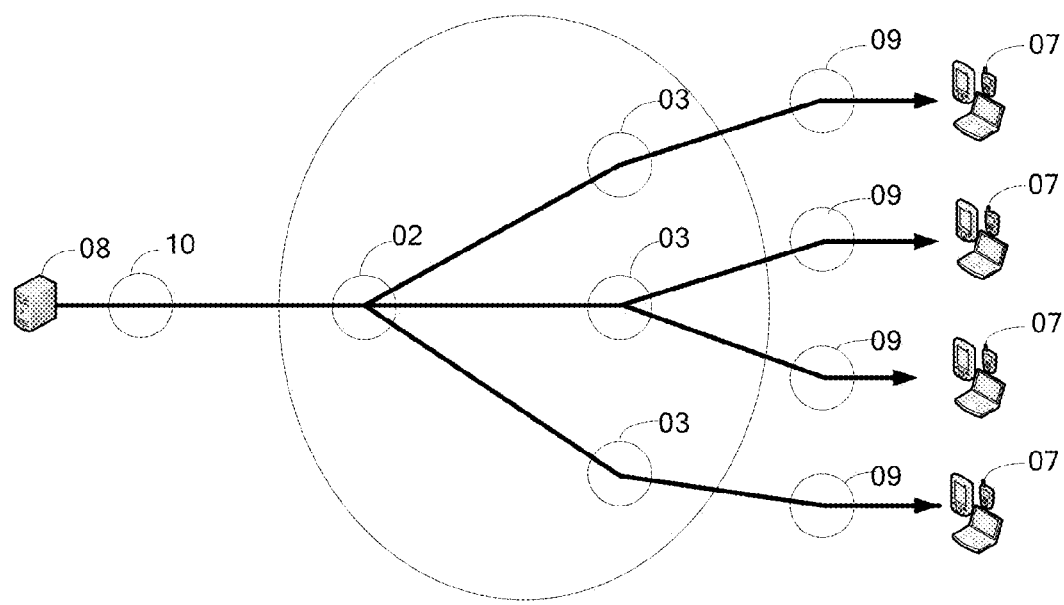
FIG. 19 is a schematic structural diagram of another communications system according to an embodiment of the present invention.

An embodiment of the present invention further provides a communication system 2, which includes receivers 07, a multicast source 08, user-side leaf nodes 09, and a user-side root node 10, and as shown in FIG. 19, further includes:

a network node 02 and network nodes 03 provided in the foregoing embodiments.

The embodiment of the present invention provides a communications system. First, a network-side leaf node acquires an mLDP label of a downstream user-side leaf node and FEC information by performing snooping on an mLDP mapping message of the downstream user-side leaf node, then transparently transmits the $1^{st}$ received mLDP mapping message to an upstream network-side root node, and generates a forwarding entry; then the network-side root node acquires an RSVP P2MP LSP, allocates a label value to the received FEC information, and associates a forwarding entry of each network-side leaf node with the label value of the FEC information; meanwhile, the network-side root node transparently transmits the $1^{st}$ received mLDP mapping message to an upstream user-side leaf node, and associates the mLDP label in the mLDP mapping message with the RSVP P2MP LSP and the label of the FEC information. In this way, an mLDP over RSVP point-to-multipoint multicast path is established, which is applicable to P2MP multicast in a non-VPN scenario. Because the node can acquire FEC information and an mLDP label of a downstream node from an mLDP mapping message by snooping, it is not necessary for each node to completely support mLDP, so that deployment can also be implemented when a node does not support mLDP. Further, during packet forwarding, excessive packet replication can be avoided, and bandwidth resources can be saved. In addition, message suppression processing is performed on mLDP mapping messages that include the same FEC information, which further saves bandwidth and reduces processing load of the node.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual communication connections may be implemented through some interfaces. The indirect couplings or communication connections between the apparatuses or units may be implemented in electronic, mechanical, or other forms.

The units may or may not be physically separate, may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing point-to-multipoint multicast, wherein a multicast source communicates with multicast receivers by using a network running multicast Label Distribution Protocol (mLDP) and a network running Reservation Protocol (RSVP), wherein the network running RSVP comprises a network-side root node and network-side leaf nodes, wherein the network-side root node is a Provider Edge (PE) node that is in the network running RSVP and is oriented to the multicast source, wherein the network-side leaf nodes are PE nodes that are in the network running RSVP and are oriented to the multicast receivers, wherein the network-side root node communicates with the multicast source by using the network running mLDP, wherein the network-side leaf nodes communicate with the multicast receivers by using the network running mLDP, wherein the network running mLDP comprises a user-side root node and user-side leaf nodes, wherein the user-side root node is a PE node that is in the network running mLDP and is oriented to the multicast source, and wherein the user-side leaf nodes are PE nodes that are in the network running mLDP and are oriented to the multicast receivers, the method comprising:

receiving, by the network-side root node, an mLDP mapping message, which is sent by a user-side leaf node and forwarded by at least one network-side leaf node, wherein the mLDP mapping message comprises forwarding equivalence class (FEC) information and an mLDP label of the user-side leaf node that sends the mLDP mapping message;

acquiring, by the network-side root node, from the mLDP mapping message, the FEC information and the mLDP label of the user-side leaf node that sends the mLDP mapping message;

acquiring, by the network-side root node, a Resource Reservation Protocol point-to-multipoint path (RSVP P2MP LSP) according to the user-side leaf node that sends the mLDP mapping message;

allocating, by the network-side root node, a label of the FEC information to the FEC information, and sending the label of the FEC information to all the network-side leaf nodes that are on the RSVP P2MP LSP and forward the mLDP mapping message;

generating, by the network-side root node, a packet forwarding entry of the network-side root node according to an mLDP label in the mLDP mapping message received by the network-side root node, the RSVP P2MP LSP, and the label of the FEC information; and forwarding, by the network-side root node, only the first received mLDP mapping message among received mLDP mapping messages that belong to the same FEC information, to the user-side root node.

2. The method according to claim 1, wherein the generating a packet forwarding entry of the network-side root node according to an mLDP label in the first mLDP mapping message received by the network-side root node, the RSVP P2MP LSP, and the label of the FEC information comprises:

associating the mLDP label in the first mLDP mapping message received by the network-side root node with the RSVP P2MP LSP and the label of the FEC information, and generating the packet forwarding entry of the network-side root node, wherein the mLDP label in the first mLDP mapping message received by the network-side root node is set as an incoming label, and an RSVP label of a downstream node that sends the mLDP mapping message is set as an outgoing label, wherein the RSVP label of the downstream node that forwards the mLDP mapping message is allocated when the RSVP P2MP LSP is established.

3. The method according to claim 1, wherein the method further comprises:

receiving a first multi-protocol label switching packet from an upstream node, wherein the first multi-protocol label switching packet is encapsulated by the user-side root node by using the mLDP label of the user-side leaf node;

removing the mLDP label of the user-side leaf node from the first multi-protocol label switching packet to obtain a second multi-protocol label switching packet;

replicating the second multi-protocol label switching packet to obtain third multi-protocol label switching packets, wherein a number of third multi-protocol label switching packets obtained by replicating the second multi-protocol label switching packet is equal to a number of outgoing labels in the packet forwarding entry of the network-side root node; and encapsulating the third multi-protocol label switching packets by using the label of the FEC information and a RSVP label of a downstream node that forwards the mLDP mapping message, to obtain a fourth multi-protocol label switching packet, wherein the label of the FEC information is used as an inner label, and the RSVP label of the downstream node that forwards the mLDP mapping message is used as an outer label, and sending the fourth multi-protocol label switching packet to the downstream node corresponding to the RSVP label of the downstream node that forwards the mLDP mapping message.

4. A network node comprising:

a processor;

a non-transitory computer readable medium connected to the processor and having stored thereon instructions that, when executed, cause the processor to:

receive a multicast Label Distribution Protocol (mLDP) mapping message, which is sent by a user-side leaf node and forwarded by at least one downstream node; perform snooping on the mLDP mapping message to acquire, from the mLDP mapping message, forwarding equivalence class (FEC) information and an mLDP label of the user-side leaf node to which the mLDP mapping message belongs; acquire a Reservation Protocol point-to-multipoint path (RSVP P2MP LSP); allocate a label to the FEC information; send the label of the FEC information to all the nodes that are on the RSVP P2MP LSP and that forward the mLDP mapping messages;

generate a packet forwarding entry of the network node according to an mLDP label in a first mLDP mapping message received by the network node, the RSVP P2MP LSP, and the label of the FEC information; and forward only the first received mLDP mapping message among received mLDP mapping messages that belong to the same FEC information, to an upstream node.

5. The network node according to claim 4, wherein non-transitory computer readable medium further has instructions stored thereon, that when executed, cause the processor to:

receive a multi-protocol label switching packet from an upstream node, wherein the multi-protocol label switching packet is encapsulated by a user-side root node by using the mLDP label of the user-side leaf node;

remove the mLDP label of the user-side leaf node from the multi-protocol label switching packet;

send the multi-protocol label switching packet with the mLDP label removed, to a second packet replicating unit; and replicate the multi-protocol label switching packet with the mLDP label removed, wherein a number of replicated multi-protocol label switching packets is equal to a number of outgoing labels in the packet forwarding entry of the network node;

encapsulate the replicated multi-protocol label switching packets by using the label of the FEC information and a Reservation Protocol (RSVP) label of the downstream node that forwards the mLDP mapping message, wherein the label of the FEC information is used as an inner label, and the RSVP label of the downstream node that forwards the mLDP mapping message is used as an outer label; and send the multi-protocol label switching packet to the downstream node corresponding to the RSVP label of the downstream node that forwards the mLDP mapping message.

* * * * *